United States Patent
Shikata et al.

(10) Patent No.: US 8,740,700 B2
(45) Date of Patent: Jun. 3, 2014

(54) GAME SYSTEM, GAME PROCESSING METHOD, GAME APPARATUS, HANDHELD GAMING DEVICE, AND STORAGE MEDIUM

(75) Inventors: Hiromasa Shikata, Kyoto (JP); Shinji Okane, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 39 days.

(21) Appl. No.: 13/352,763

(22) Filed: Jan. 18, 2012

(65) Prior Publication Data
US 2013/0095921 A1    Apr. 18, 2013

(30) Foreign Application Priority Data
Oct. 17, 2011   (JP) ................................ 2011-228306

(51) Int. Cl.
*A63F 13/06*    (2006.01)

(52) U.S. Cl.
USPC .............................................. 463/31; 463/37

(58) Field of Classification Search
USPC .............. 463/30–34, 36–38, 40–42
See application file for complete search history.

(56) References Cited

U.S. PATENT DOCUMENTS
6,921,336 B1 *   7/2005   Best ................................ 463/32
2002/0022520 A1   2/2002   Oe et al.

FOREIGN PATENT DOCUMENTS
JP    2001-293254    10/2001

OTHER PUBLICATIONS
Pikmin Instruction Booklet, Nintendo GameCube, 2001.*
Pikmin 2 Instruction Booklet, Nintendo GameCube, 2004.*
http://www.youtube.com/watch?v=gcPnUHfoifc, Pikmin 2 Review—YouTube video, Nov. 8, 2010.*
http://www.youtube.com/watch?v=wOHkE_mmMv4, Pikmin 2—2 Player Battle—YouTube video, Apr. 15, 2008.*

* cited by examiner

*Primary Examiner* — Damon Pierce
(74) *Attorney, Agent, or Firm* — Nixon & Vanderhye, P.C.

(57) ABSTRACT

An object control section individually moves, in a virtual space, a plurality of first objects each associated to a direction input section among a plurality of direction input sections disposed on a first operating device, in accordance with directions inputted through the associated direction input sections. A virtual camera control section controls a first virtual camera in the virtual space. A game image generation section generates a first game image based on the first virtual camera. The virtual camera control section rotates the first virtual camera in accordance with the positions of the plurality of the first objects in the virtual space, such that a certain one of the first objects first game image is displayed on a predetermined side with regard to a displayed position of another one of the first objects.

20 Claims, 17 Drawing Sheets

FIG. 13 COMPARATIVE EXAMPLE

GAME SYSTEM, GAME PROCESSING METHOD, GAME APPARATUS, HANDHELD GAMING DEVICE, AND STORAGE MEDIUM

CROSS REFERENCE TO RELATED APPLICATION

The disclosure of Japanese Patent Application No. 2011-228306, filed on Oct. 17, 2011, is incorporated herein by reference.

FIELD

The exemplary embodiments disclosed herein relate to game systems, game processing methods, game apparatuses, handheld gaming devices, and storage media; and in particular, relate to game systems, game processing methods, game apparatuses, handheld gaming devices, and storage media for individually moving a plurality of objects through a usage of a plurality of direction input sections provided on an operating device.

BACKGROUND AND SUMMARY

Conventionally, there are games in which a plurality of player characters are individually moved in a virtual space through a usage of a plurality of operating devices a controller, a handheld gaming device, or the like) including a direction input section.

In such games described above, when an operating device including a plurality of direction input sections is used, it is also possible to individually move a plurality of player characters through the usage of the plurality of the direction input sections provided on the operating device. Thus, for example, it is also possible for a single player to simultaneously move the plurality of the player characters by using such operating device.

However, when individually moving a plurality of player characters through the usage of a plurality of direction input sections, positions of the plurality of the player characters varyingly change while a game is played, and thereby a problem arises where it becomes difficult to understand which direction input section is associated to which player character at a glance. This is even more of a problem particularly when a single player simultaneously moves a plurality of player characters by using an operating device including a plurality of direction input sections as described above.

Therefore, a feature in the exemplary embodiments described herein is to make it easy to understand which object is associated to which direction input section when a plurality of objects are individually moved through the usage of a plurality of direction input sections.

The above described feature is achieved, for example, by the configurations described in the following.

A first configurational example is a game system including an object control section, a virtual camera control section, and a game image generation section. The object control section individually moves, in a virtual space, a plurality of first objects each associated to a direction input section among a plurality of direction input sections disposed on a first operating device, in accordance with directions inputted through the associated direction input sections. The virtual camera control section controls a first virtual camera in the virtual space in accordance with positions of the plurality of the first objects in the virtual space. The game image generation section generates a first game image based on the first virtual camera. The virtual camera control section includes a rotation control section configured to rotate the first virtual camera in accordance with the positions of the plurality of the first objects in the virtual space, such that a certain one of the first objects in the first game image is displayed on a predetermined side with regard to a displayed position of another one of the first objects.

It should be noted that, the "first operating device" may be any device (e.g., a portable display device, a controller, a handheld gaming device, or the like) having at least two direction input sections. The "direction input section" may be, for example, an analog stick or a cross button. The "predetermined side" may be, for example, the right side, the left side, the upper side, or the lower side. "Configured to rotate the first virtual camera" refers to changing a direction (attitude) of the first virtual camera, and representatively refers to rotating the first virtual camera by using, as a center, an axis perpendicular with respect to a game field (e.g., any axis that is parallel to the Z-axis in FIG. 6).

It should be noted that, the first operating device may include a first display section; the first game image may be displayed on the first display section; and the plurality of the direction input sections may include a first direction input section disposed on a left side of the first display section and a second direction input section disposed on a right side of the first display section. Furthermore, the object control section may move a left object among the plurality of the first objects in accordance with a direction inputted through the first direction input section, and also may move a right object among the plurality of the first objects in accordance with a direction inputted through the second direction input section; and rotation control section may rotate the first virtual camera such that the right object is displayed in the first game image on a right side with regard to a displayed position of the left object.

Furthermore, the rotation control section may adjust a rotational velocity of the first virtual camera in accordance with a distance between the right object and the left object.

Furthermore, the game system may further include a simultaneous operation determination section configured to determine whether the right object and the left object are simultaneously in motion. The rotation control section may rotate the first virtual camera when the right object and the left object are simultaneously in motion, and may suspend rotating of the first virtual camera when only either one of the right object and the left object is in motion.

Furthermore, the virtual camera control section may control an angle of view or a position of the virtual camera such that the plurality of the first objects are all displayed.

Furthermore, the first operating device may further include a reception section configured to receive the first game image from a game apparatus including the object control section, the virtual camera control section, and the game image generation section.

Furthermore, the object control section may control, in the virtual space, a plurality of second objects each associated to a second operating device among a plurality of second operating devices, in accordance with inputs from the associated second operating devices; the game image generation section may generate a second game image including the plurality of the second objects based on at least one second virtual camera; and the game apparatus may further include an image output section configured to output the second game image to a display device.

Furthermore, the first operating device may be a handheld gaming device including the object control section, the virtual camera control section, and the game image generation section.

A second configurational example is a game processing method executed by a computer. The game processing method includes the steps of: individually moving, in a virtual space, a plurality of first objects each associated to a direction input section among a plurality of direction input sections disposed on a first operating device, in accordance with directions inputted through the associated direction input sections; controlling a first virtual camera in the virtual space in accordance with positions of the plurality of the first objects in the virtual space; and generating a first game image based on the first virtual camera, wherein when the controlling of the first virtual camera is performed, rotating of the first virtual camera is performed in accordance with the positions of the plurality of the first objects in the virtual space, such that a certain one of the first objects in the first game image is displayed on a predetermined side with regard to a displayed position of another one of the first objects.

A third configurational example is a game apparatus including an object control section, a virtual camera control section, and a game image generation section. The object control section individually moves, in a virtual space, a plurality of first objects each associated to a direction input section among a plurality of direction input sections disposed on a first operating device, in accordance with directions inputted through the associated direction input sections. The virtual camera control section controls a first virtual camera in the virtual space in accordance with positions of the plurality of the first objects in the virtual space. The game image generation section generates a first game image based on the first virtual camera. The virtual camera control section includes a rotation control section configured to rotate the first virtual camera in accordance with the positions of the plurality of the first objects in the virtual space, such that a certain one of the first objects in the first game image is displayed on a predetermined side with regard to a displayed position of another one of the first objects.

A fourth configurational example is a handheld gaming device including a plurality of direction input sections, an object control section, a virtual camera control section, a game image generation section, and a first display section. The object control section individually moves, in a virtual space, a plurality of first objects each associated to a direction input section among the plurality of the direction input sections, in accordance with directions inputted through the associated direction input sections. The virtual camera control section controls a first virtual camera in the virtual space in accordance with positions of the plurality of the first objects in the virtual space. The game image generation section generates a first game image based on the first virtual camera. The first display section displays the first game image. The virtual camera control section includes a rotation control section configured to rotate the first virtual camera in accordance with the positions of the plurality of the first objects in the virtual space, such that a certain one of the first objects in the first game image is displayed on a predetermined side with regard to a displayed position of another one of the first objects.

A fifth configurational example is a computer-readable storage medium having stored thereon a game program executed by a computer, and the computer is caused to function as an object control section, a virtual camera control section, and a game image generation section. The object control section individually moves, in a virtual space, a plurality of first objects each associated to a direction input section among a plurality of direction input sections disposed on a first operating device, in accordance with directions inputted through the associated direction input sections. The virtual camera control section controls a first virtual camera in the virtual space in accordance with positions of the plurality of the first objects in the virtual space. The game image generation section generates a first game image based on the first virtual camera. The virtual camera control includes a rotation control section configured to rotate the first virtual camera in accordance with the positions of the plurality of the first objects in the virtual space, such that a certain one of the first objects in the first game image is displayed on a predetermined side with regard to a displayed position of another one of the first objects.

With the exemplary embodiments disclosed herein, it becomes easy to understand which object is associated to which direction input section.

These and other features, aspects and advantages of the exemplary embodiments disclosed herein will become more apparent from the following detailed description of the certain exemplary embodiments when taken in conjunction with the accompanying drawings.

DETAILED DESCRIPTION OF NON-LIMITING EXAMPLE EMBODIMENTS

A game system according to one embodiment will be described with reference to FIG. 1.

Figure 1:
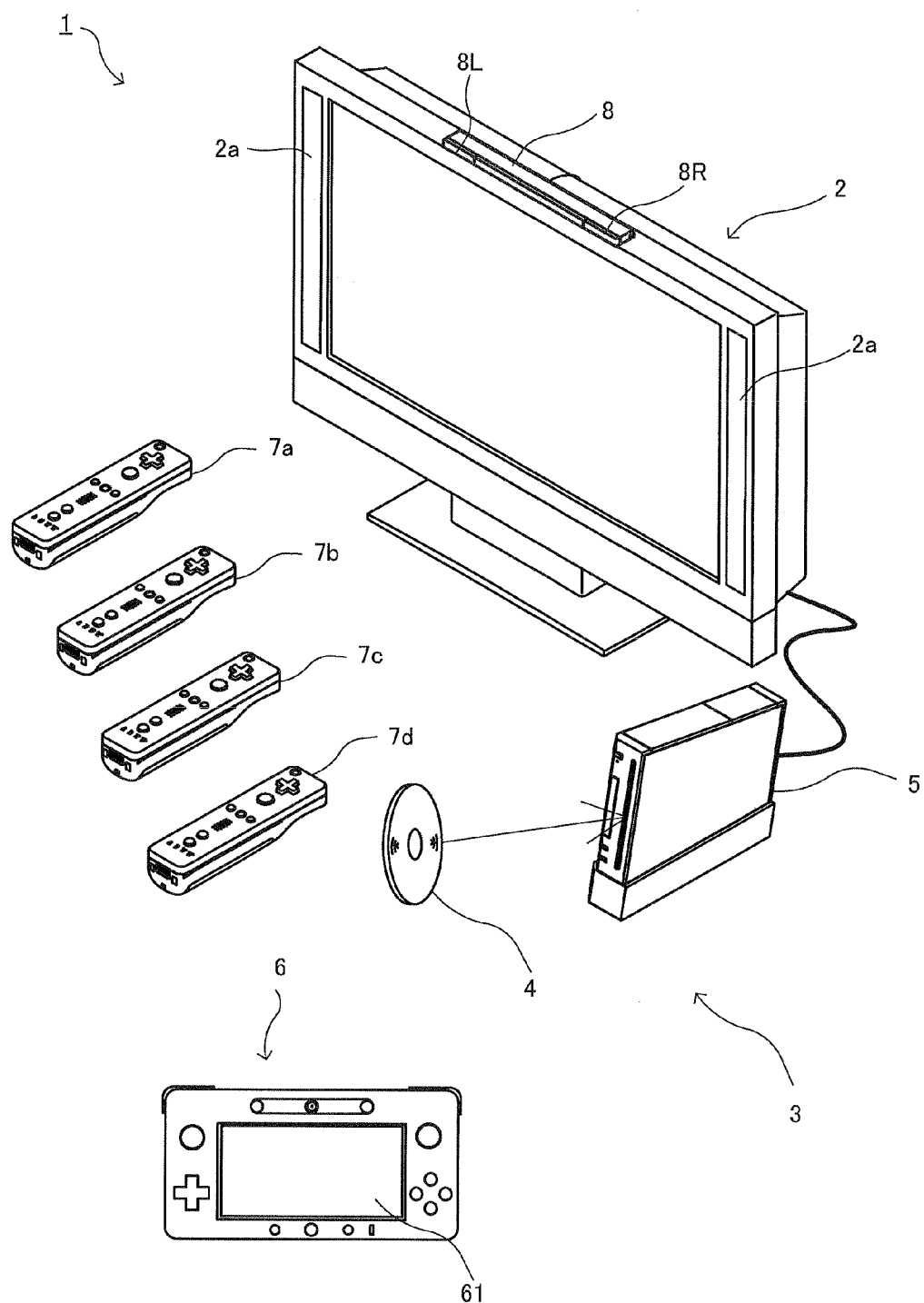
FIG. 1 is a perspective view showing a non-limiting example of a game system 1 according to one embodiment.

As shown in FIG. 1, a game system 1 includes a household television receiver (hereinafter, referred to as a monitor) 2, and a stationary game apparatus 3 connected to the monitor 2 via a connection cord. The monitor 2 includes loudspeakers 2a. Furthermore, the game apparatus 3 includes an optical disc 4, a game apparatus body 5, a terminal device 6, and controllers 7a, 7b, 7c, and 7d (hereinafter, described simply as a controller 7 when there is no particular need to distinguish these as the controllers 7a, 7b, 7c, and 7d).

The optical disc 4 has stored therein an information processing program (typically, a game program) to be executed by the game apparatus body 5.

The monitor 2 displays a game image outputted from the game apparatus body 5. The monitor 2 includes the loudspeakers 2a, and each of the loudspeakers 2a outputs a game sound outputted from the game apparatus body 5.

The game apparatus body 5 executes a game process or the like based on a game program stored in the optical disc 4.

A plurality of operation sections (operation buttons) are provided on the controller 7. The controller 7 transmits, to the game apparatus body 5, operation data (controller operation data) representing input states (whether or not each of the operation buttons has been held down) of the operation sections by using, for example, Bluetooth (registered trademark) technology.

Furthermore, the controller 7 includes an imaging section for taking images of a marker 8 having two LED modules (hereinafter, referred to as "markers") 8L and 8R disposed in the vicinity (in the upper side of the screen in FIG. 1) of the display screen of the monitor 2, and an imaging information calculation section for calculating positions of the markers within an image taken by the imaging section. The positions of the markers calculated by the imaging information calculation section are transmitted to the game apparatus body 5 as marker coordinate data. In the game apparatus body 5, the movement, position, attitude, and the like can be calculated by the controller 7 based on the marker coordinate data.

Furthermore, the controller 7 is provided with an acceleration sensor and a gyro sensor. Acceleration data representing acceleration detected by the acceleration sensor and angular velocity data representing angular velocity detected by the gyro sensor are transmitted to the game apparatus body 5. In the game apparatus body 5, directions, movements, and behaviors of the controller 7 can be calculated based on the acceleration data and/or the angular velocity data.

The terminal device 6 is a portable device that is small enough to be held by a user, and the user is allowed to move the terminal device 6 with hands, or place the terminal device 6 at any location. Although the specific structure of the terminal device 6 will be described later, the terminal device 6 includes an LCD (Liquid Crystal Display) 61 as display means, and input means (a touch panel 62, a gyro sensor 604, and the like described later). The terminal device 6 and the game apparatus body 5 are communicable with each other wirelessly or via a cable. The terminal device 6 receives, from the game apparatus body 5, data of an image (e.g., a game image) generated in the game apparatus body 5, and displays the image represented by the data on an LCD 61. Although in the exemplary embodiment, an LCD is used as a display device, the terminal device 6 may include any other display device, such as a display device utilizing EL (Electro Luminescence), for example. Further, the terminal device 6 transmits, to the game apparatus body 5, operation data representing the content of an operation performed on the terminal device 6.

Figure 2:
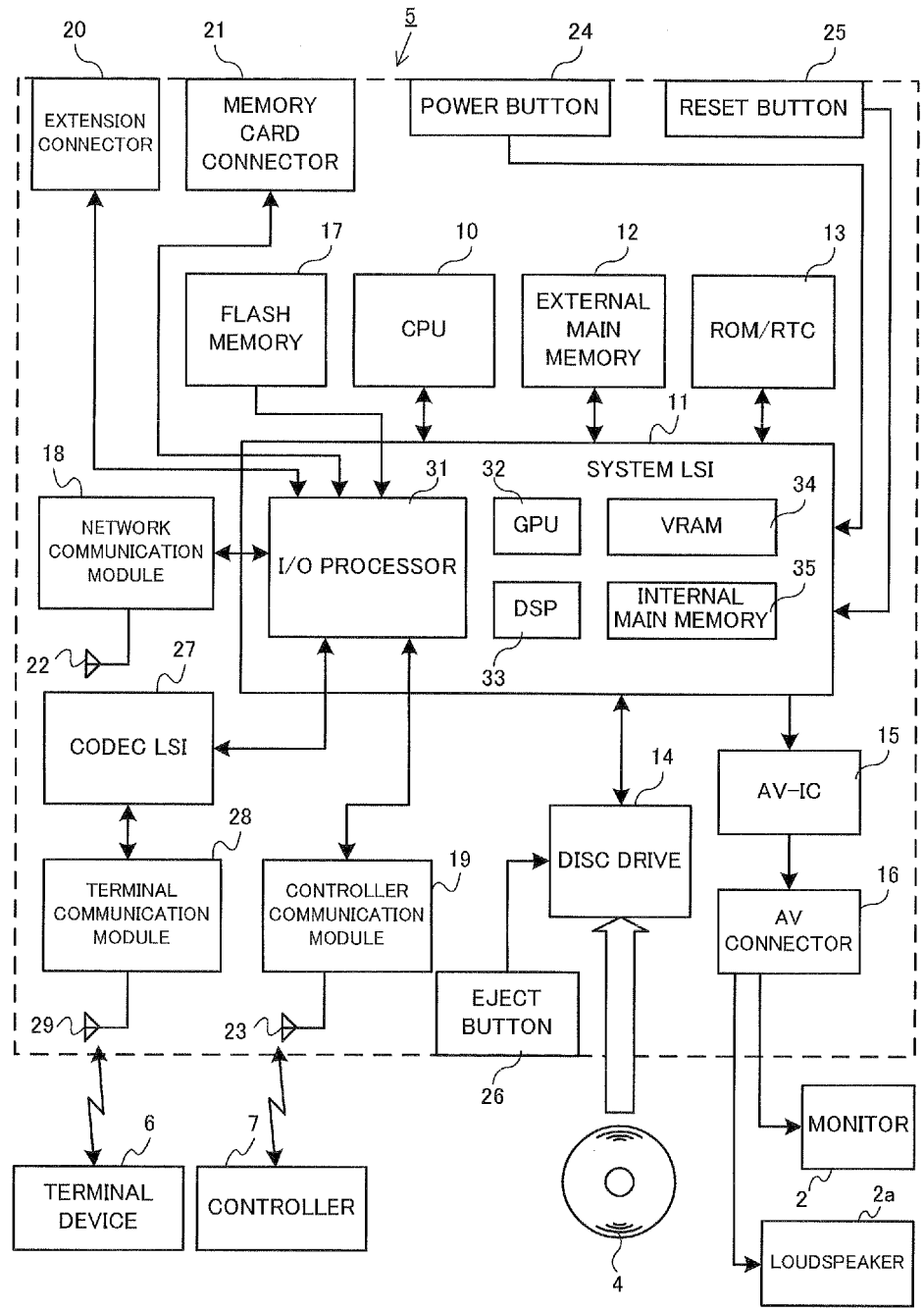
FIG. 2 is a functional block diagram showing a non-limiting example of a game apparatus body 5 in FIG. 1.

Next, with reference to FIG. 2, an internal structure of the game apparatus body 5 will be described. FIG. 2 is a block diagram illustrating an example of an internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

In addition to the CPU 10, the external main memory 12, the ROM/RTC 13, the disc drive 14, and the AV-IC 15 are connected to the system LSI 11. The external main memory 12, which is a volatile memory, is used as a work region and a buffer region for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35.

The GPU 32 generates an image in accordance with a graphics command (draw command) supplied from the CPU 10. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image," and the game image to be displayed on the terminal device 6 may be referred to as a "terminal game image."

The DSP 33, serving as an audio processor, generates sound data by using sound data and sound waveform (tone quality) data stored in the internal main memory 35 and the external main memory 12. In the exemplary embodiment, similarly to the game images, both a game sound to be outputted from the loudspeakers 2a of the monitor 2 and a game sound to be outputted from the loudspeakers of the terminal device 6 may be generated. Hereinafter, the game sound to be outputted from the monitor 2 may be referred to as a "monitor game sound," and the game sound to be outputted from the terminal device 6 may be referred to as a "terminal game sound."

Among the image data and sound data generated by the game apparatus body 5, the image data and sound data to be outputted to the monitor 2 are read by the AV-IC 15. Through an AV connector 16, the AV-IC 15 outputs the read image data to the monitor 2 and outputs the read sound data to the loudspeakers 2a included in the monitor 2. Thereby, an image is displayed on the monitor 2, and sounds are outputted from the loudspeakers 2a.

Further, among the image data and sound data generated by the game apparatus body 5, the image data and sound data to be outputted to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to a flash memory 17, a network communication module 18, a controller communication module 19, an extension connector 20, a memory card connector 21, and a codec LSI 27. The codec LSI 27 is connected to a terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7. That is, the I/O processor 31 receives, via the antenna 23 and the controller communication module 19, operation data or the like transmitted from the controller 7, and stores (temporarily) the data in a buffer region of the internal main memory 35 or the external main memory 12.

The game apparatus body 5 is capable of transmitting/receiving image data, sound data and the like to/from the terminal device 6. The I/O processor 31 outputs data of a game image (terminal game image) generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via an antenna 29. In the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data (terminal game sound) generated by the DSP 33 to the terminal communication module 28 via the codec LSI 27. The codec LSI 27 performs a compression process on the sound data in a manner similar to that for the image data. Any compression technique may be adopted for the sound data. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6, according to need. The control data represent control instructions for the components included in the terminal device 6, such as an instruction to control on/off of a marker section (a marker section 65 shown in FIG. 5), and an instruction to control image taking of a camera (a camera 66 shown in FIG. 5). The I/O processor 31 transmits the control data to the terminal device 6 in response to an instruction from the CPU 10.

The game apparatus body 5 can receive various data from the terminal device 6. Although details will be described later, in the exemplary embodiment, the terminal device 6 transmits operation data, image data, and sound data. The respective data transmitted from the terminal device 6 are received by the terminal communication module 28 via the antenna 29. The image data and sound data transmitted from the terminal device 6 have been subjected to a compression process similar to that for the image data and sound data transmitted from the game apparatus body 5 to the terminal device 6. Accordingly, these image data and sound data are transmitted from the terminal communication module 28 to the codec LSI 27, and subjected to a decompression process by the codec LSI 27. The decompressed data are outputted to the I/O processor 31. The operation data, which has been received by the terminal communication module 28, is outputted to the I/O processor 31 via the codec LSI 27. The I/O processor 31 stores (temporarily) the data received from the terminal device 6 in the buffer region of the internal main memory 35 or the external main memory 12.

The game apparatus body 5 is connectable to other devices and external storage media via the extension connector 20 and the memory card connector 21.

The game apparatus body 5 includes (on the front main surface thereof, for example) a power button 24, a reset button 25, an insertion slot through which the optical disc 4 is inserted, an eject button 26 for ejecting the optical disc 4 from the insertion slot of the game apparatus body 5, and the like.

In another embodiment, some of the components of the game apparatus body 5 may be constituted as an extension device separated from the game apparatus body 5. At this time, the extension device may be connected to the game apparatus body 5 via the extension connector 20, for example. Specifically, the extension device may include, for example, the codec LSI 27, the terminal communication module 28, and the antenna 29, and may be detachably connected to the extension connector 20. Thus, by connecting the extension device to the game apparatus body which does not have the above-mentioned, the game apparatus body can be made communicable with the terminal device 6.

Figure 3:
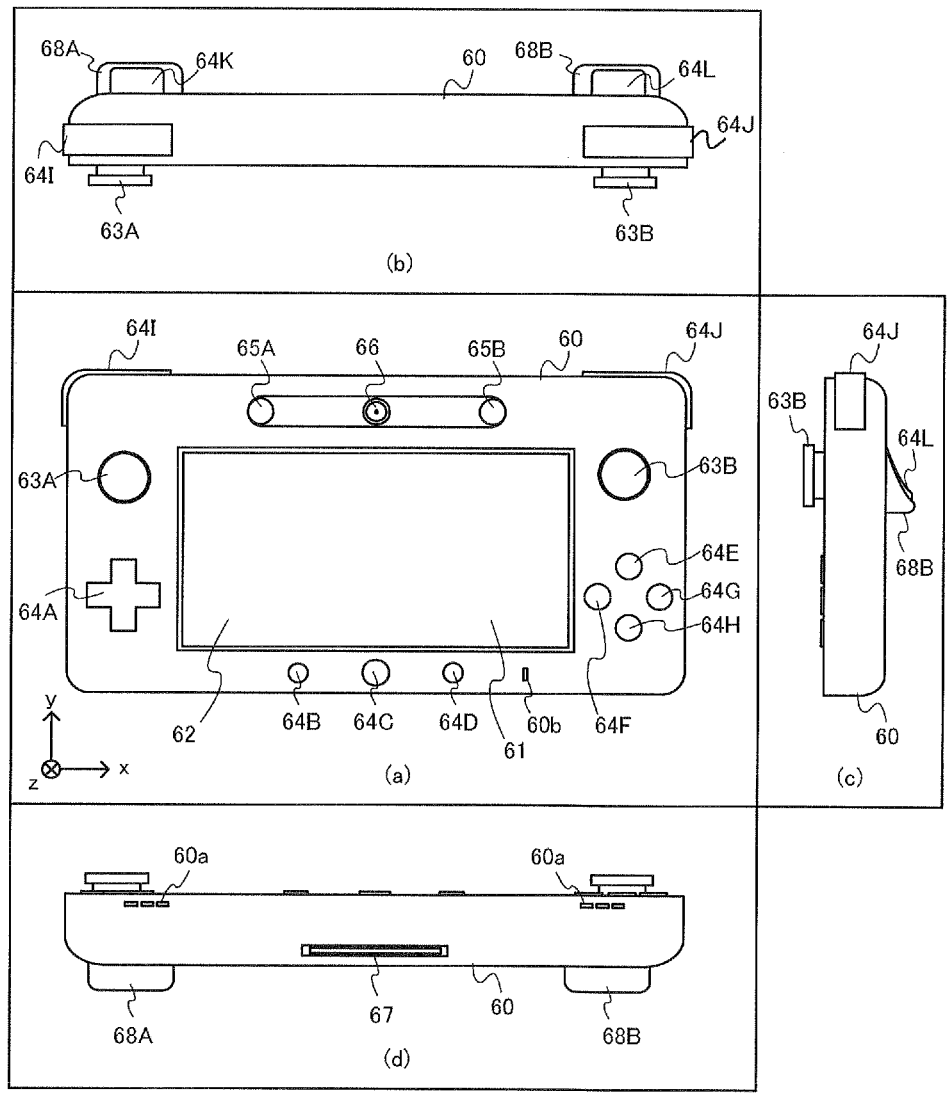
FIG. 3 shows a non-limiting example of the external configuration of a terminal device 6 in FIG. 1.
Figure 4:
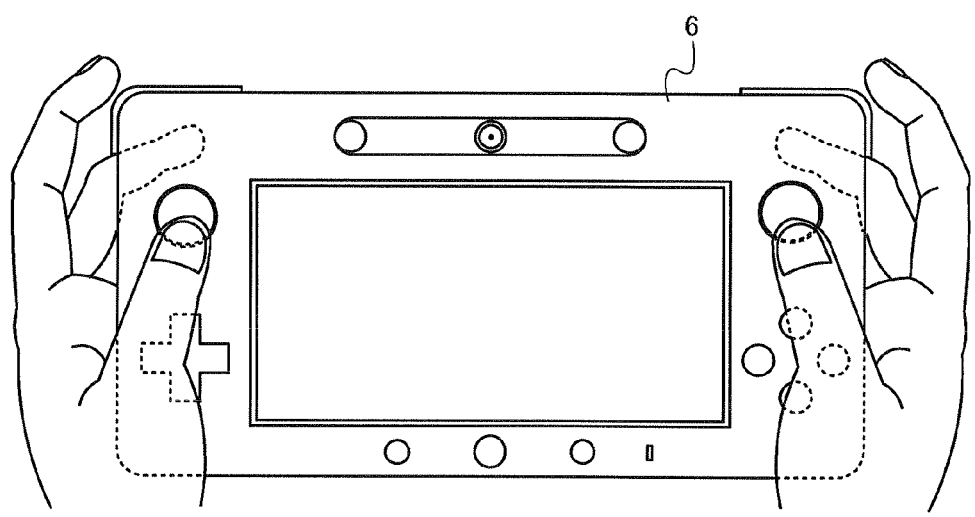
FIG. 4 shows a non-limiting example of a manner in which a user holds the terminal device 6.

Next, a structure of the terminal device 6 will be described with reference to FIG. 3 to FIG. 5. FIG. 3 is a diagram illustrating an example of an external structure of the terminal device 6. More specifically, (a) of FIG. 3 is a front view, (b) of FIG. 3 is a top view, (c) of FIG. 3 is a right side view, and (d) of FIG. 3 is a bottom view of the terminal device 6. FIG. 4 shows an example of a state in which a user holds the terminal device 6 with both hands.

As shown in FIG. 3, the terminal device 6 includes a housing 60 which generally has a horizontally long plate-like rectangular shape. The housing 60 is small enough to be held by the user.

The terminal device 6 includes the LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal device 6 while viewing a screen of the LCD 61.

As shown in (a) of FIG. 3, the terminal device 6 includes, as operation means, a touch panel 62 on the screen of the LCD 61. In the exemplary embodiment, the touch panel 62 is, but is not limited to, a resistive film type touch panel, and a touch panel of any type, such as electrostatic capacitance type, may be used. The touch panel 62 may be of single touch type or multiple touch type. In the exemplary embodiment, the touch panel 62 has the same resolution (detection accuracy) as that of the LCD 61. However, the resolution of the touch panel 62 and the resolution of the LCD 61 need not be the same. Since the terminal device 6 has the touch panel 62, the user is allowed to operate the touch panel 62 while moving the terminal device 6. That is, the user is allowed to directly (by using the touch panel 62) perform an input onto the screen of the LCD 61 while moving the LCD 61.

As shown in FIG. 3, the terminal device 6 has, as operation means, two analog sticks 63A and 63B, and a plurality of operation buttons 64A to 64L. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60.

The respective operation buttons 64A to 64L are assigned functions, according to need, in accordance with a game program. For example, the cross button 64A may be used for direction designation operation, selection operation, and the like; and the operation buttons 64E to 64H may be used for determination operation, cancellation operation, and the like.

As shown in (a) of FIG. 3, the terminal device 6 includes a marker section (the marker section 65 shown in FIG. 5) including a marker 65A and a marker 65B, on the front surface of the housing 60. The markers 65A and 65B are each constituted by one or more infrared LEDs. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be turned on or off.

The terminal device 6 includes the camera 66. The camera 66 is disposed on the surface of the housing 60. Accordingly, the camera 66 is capable of taking an image of the face of the user holding the terminal device 6. For example, the camera 66 can take an image of the user who is playing a game while viewing the LCD 61.

The terminal device 6 has a microphone (a microphone 609 shown in FIG. 5) as sound input means. The microphone 609 is embedded in the housing 60 at a position inside the microphone hole 60b. The microphone 609 detects for a sound, such as user's voice, around the terminal device 6.

Figure 5:
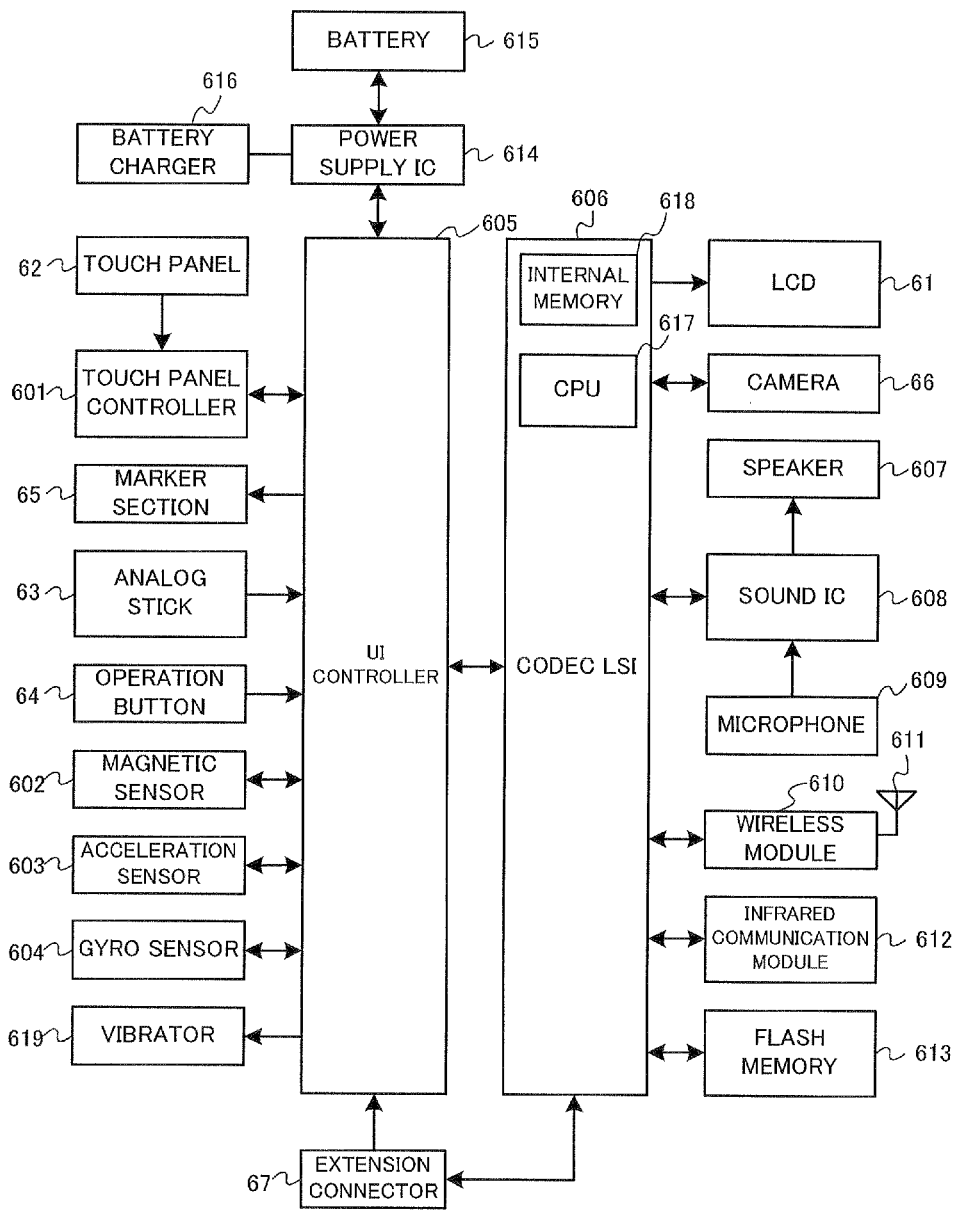
FIG. 5 is a block diagram showing a non-limiting example of the internal configuration of the terminal device 6 in FIG. 3.

The terminal device 6 has loudspeakers (loudspeakers 607 shown in FIG. 5). Sound from the loudspeakers 607 is outputted from loudspeaker holes 60a provided on the lower side surface of the housing 60.

The terminal device 6 includes an extension connector 67 for connecting other devices to the terminal device 6.

In the terminal device 6 shown in FIG. 3, the shapes of the operation buttons and the housing 60, the number of the respective components, and the positions in which the components are provided are merely examples. The shapes, numbers, and positions may be different from those described above.

Next, an internal structure of the terminal device 6 will be described with reference to FIG. 5. FIG. 5 is a block diagram illustrating an example of an internal structure of the terminal device 6. As shown in FIG. 5, the terminal device 6 includes, in addition to the components shown in FIG. 3, a touch panel controller 601, a magnetic sensor 602, an acceleration sensor 603, the gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, an analog stick 63 (the analog sticks 63A and 63B), the operation button 64 (the operation buttons 64A to 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable.

The touch panel controller 601 is a circuit which is connected to the touch panel 62 and controls the touch panel 62. The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions are outputted from the UI controller 605 to the touch panel controller 601.

The analog stick 63 outputs, to the UI controller 605, stick data representing an amount and direction of the sliding (or tilting) of the stick part. The operation button 64 outputs, to the UI controller 605, operation button data representing an input status of each of the operation buttons 64A to 64L (whether or not the operation button is pressed).

The magnetic sensor 602 detects the magnitude and direction of a magnetic field to detect an orientation. Orientation data representing the detected orientation is outputted to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a Hall sensor, a GMR (Giant Magneto Resistance) sensor, a TMR (Tunneling Magneto Resistance) sensor, and an AMR (Anisotropic Magneto Resistance) sensor. However, any sensor may be adopted as long as the sensor can detect an orientation.

The acceleration sensor 603 is provided inside the housing 60. The acceleration sensor 603 detects the magnitudes of linear accelerations in all three axial directions (xyz axial directions shown in (a) of FIG. 3). Acceleration data representing the detected accelerations is outputted to the UI controller 605. The UI controller 605 outputs, to the acceleration sensor 603, a control instruction for the acceleration sensor 603.

The gyro sensor 604 is provided inside the housing 60. The gyro sensor 604 detects the angular velocities around all the three axes (the above-described xyz axes). Angular velocity data representing the detected angular velocities is outputted to the UI controller 605. The UI controller 605 outputs, to the gyro sensor 604, a control instruction for the gyro sensor 604.

The vibrator 619 is, for example, a vibration motor or a solenoid, and the terminal device 6 is vibrated by actuating the vibrator 619 in accordance with a control instruction outputted from the UI controller 605 to the vibrator 619.

The UI controller 605 outputs, to the codec LSI 606, the operation data (hereinafter, referred to as terminal operation data) including the touch position data, the stick data, the operation button data, the orientation data, the acceleration data and the angular velocity data, which have been received from the respective components.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal device 6 is configured not to perform a game process, the terminal device 6 may execute a program for managing the terminal device 6 or a program for communication. For example, a program stored in the flash memory 613 is loaded into the internal memory 618 and executed by the CPU 617 when the terminal device 6 is powered on, thereby starting up the terminal device 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is a circuit for controlling input of sound data to the microphone 609 and output of sound data from the loudspeakers 607.

The codec LSI 606 transmits the image data from the camera 66, the sound data from the microphone 609, and the terminal operation data from the UI controller 605 to the game apparatus body 5 via the wireless module 610. In the exemplary embodiment, the codec LSI 606 subjects the image data and the sound data to a compression process similar to that performed by the codec LSI 27. The compressed image data and sound data, and the terminal operation data are outputted to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE802.11n standard.

As described above, the transmission data transmitted from the terminal device 6 to the game apparatus body 5 includes the terminal operation data, the image data, and the sound data. If another device is connected to the terminal device 6 through the extension connector 67, data received from the other device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, according to need.

As described above, the compressed image data and sound data are transmitted from the game apparatus body 5 to the terminal device 6. These data are received by the codec LSI 606 through the antenna 611 and the wireless module 610. The codec LSI 606 decompresses the received image data and sound data. The decompressed image data is outputted to the LCD 61, and an image according to the image data is displayed on the LCD 61. On the other hand, the decompressed sound data is outputted to the sound IC 608, and a sound based on the sound data is outputted from the loudspeakers 607.

When control data is included in the data received from the game apparatus body 5, the codec LSI 606 and the UI controller 605 provide control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal device 6. In the exemplary embodiment, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 6 to the game apparatus body 5.

Next, a general outline of a game process executed by the game system 1 of the exemplary embodiment will be described with reference to FIG. 6 to FIG. 12.

Figure 8:
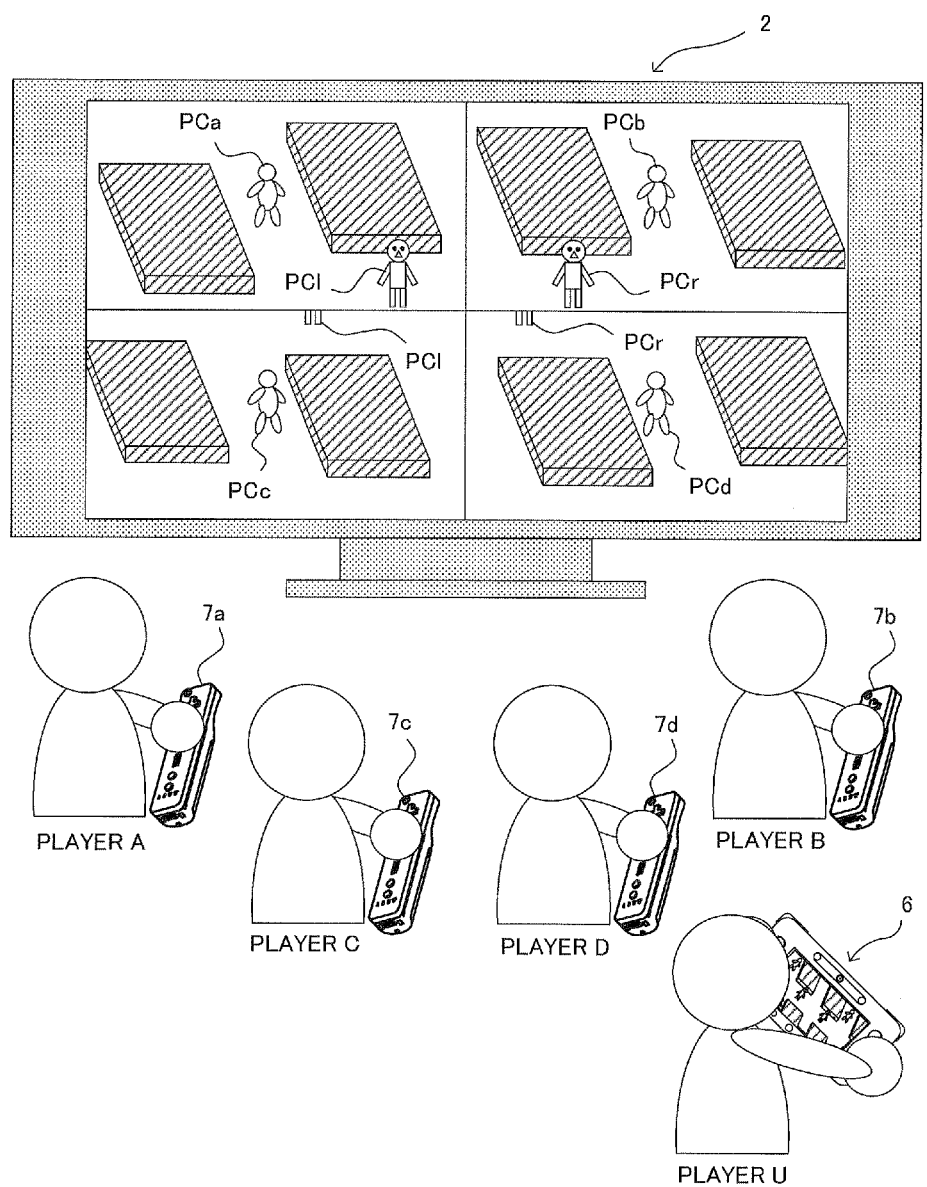
FIG. 8 shows a non-limiting example of a monitor game image.

With the game system 1, a plurality of players can play a game together by using the terminal device 6 and the controllers 7a, 7b, 7c, and 7d (as seen in FIG. 8). Here, a case will be described in which a game is played together by five players: player A, player B, player C, player D, and player U.

Figure 6:
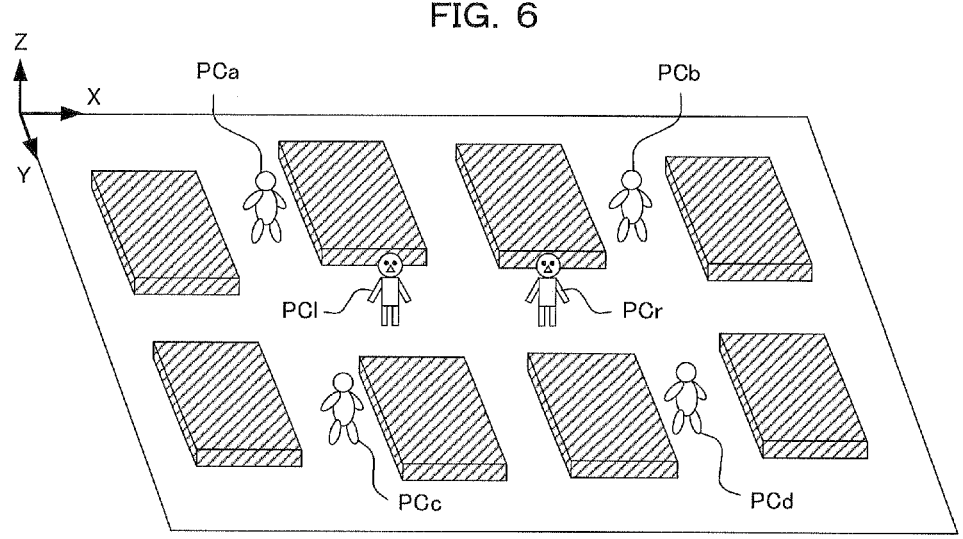
FIG. 6 shows a non-limiting example of a virtual space at a certain point in time.

FIG. 6 shows an appearance of a virtual space used in the game. Arranged on a game field in the virtual space are six player characters PCa, PCb, PCc, PCd, PCl, and PCr, and a plurality of obstacles. In addition, fruits, which are not shown, are also arranged on the game field.

The player characters PCa, PCb, PCc, and PCd are associated to the controllers 7a, 7b, 7c, and 7d, respectively. Here, the player A moves the player character PCa by operating a cross button disposed on a controller 7a; the player B moves the player character PCb by operating a cross button disposed on a controller 7b; the player C moves the player character PCc by operating a cross button disposed on a controller 7c; and the player D moves the player character PCd by operating a cross button disposed on a controller 7d.

The player character PCl is associated to the analog stick 63A of the terminal device 6, and the player character PCr is associated to the analog stick 63B of the terminal device 6. In this case, the player U moves the two player characters PCl and PCr by operating two direction input sections (the analog sticks 63A and 63B) disposed on the terminal device 6.

An objective for the players A to D is to collect a prescribed number of fruits (not shown) arranged on the game field by moving the player characters PCa, PCb, PCc, and PCd. An objective for the player U is to move the player characters PCl and PCr to catch the other player characters PCa, PCb, PCc, and PCd for three times or more. Therefore, if the players A to D collect the prescribed number of the fruits, it is a victory for the players A to D; and if the player U catches the player characters PCa, PCb, PCc, and PCd for three times or more before the players A to D collect the prescribed number of the fruits, it is a victory for the player U.

It should be noted that movement velocities of the player characters PCl and PCr and the player characters PCa, PCb, PCc, and PCd are configured to be about the same. Therefore, if only either one of the player characters PCl and PCr were to chase the player character PCa, PCb, PCc, or PCd, it is difficult to catch the player character PCa, PCb, PCc, or PCd, and a long time will be required. However, it is possible to efficiently catch the player character PCa, PCb, PCc, or PCd by simultaneously moving the two player characters PCl and PCr so as to perform a pincer approach on the player character PCa, PCb, PCc, or PCd by using the two player characters PCl and PCr.

Figure 7:
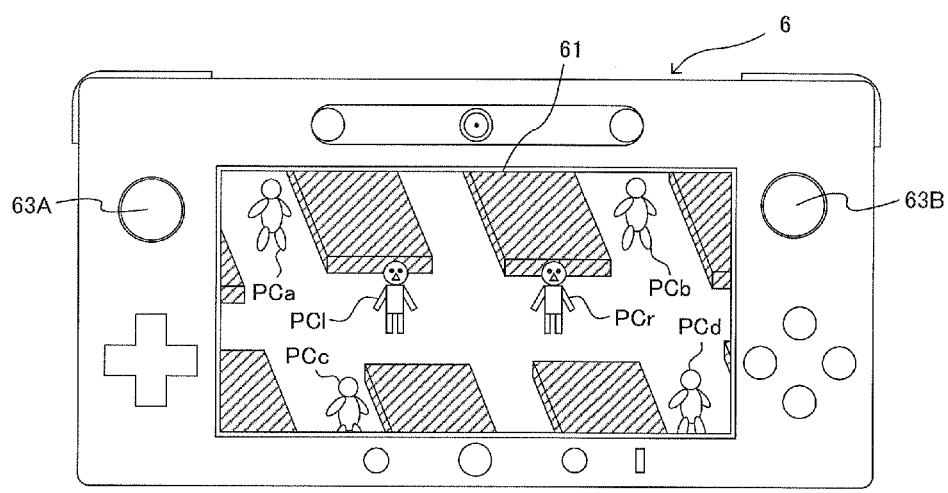
FIG. 7 shows a non-limiting example of a terminal game image.

FIG. 7 shows a game image (terminal game image) displayed on the LCD 61 of the terminal device 6 when the player characters PCa, PCb, PCc, PCd, PCl, and PCr are located at positions shown in FIG. 6. The player characters PCl and PCr are displayed in the terminal game image such that the halfway point between the player characters PCl and PCr is located almost at the center of the screen. Furthermore, in the terminal game image, the player character PCl is displayed on the left side with regard to a displayed position of the player character PCr (in other words, the player character PCr is displayed on the right side with regard to a displayed position of the player character PCl). The player U moves the player characters PCl and PCr by operating the analog sticks 63A and 63B while looking at the terminal game image.

As previously described, the player character PCl is associated to the analog stick 63A, and the player character PCr is associated to the analog stick 63B. Therefore, as a result of having the player character PCl displayed on the left side with regard to the displayed position of the player character PCr in the terminal game image, the player U can easily and intuitively understand respective associative relationships between the analog sticks 63A, 63B and the player characters PCl, PCr.

FIG. 8 shows a game image (monitor game image) displayed on the monitor 2 when the player characters PCa, PCb, PCc, PCd, PCl, and PCr are located at positions shown in FIG. 6. In the exemplary embodiment, the monitor game image consists of four sub images for the players A to D. A sub image for the player A is displayed on the upper left area of the screen, a sub image for the player B is displayed on the upper right area of the screen, a sub image for the player C is displayed on the lower left area of the screen, and a sub image for the player D is displayed on the lower right area of the screen. The respective player characters PCa, PCb, PCc, and PCd are displayed at almost at the centers of the respective sub images.

Figure 9:
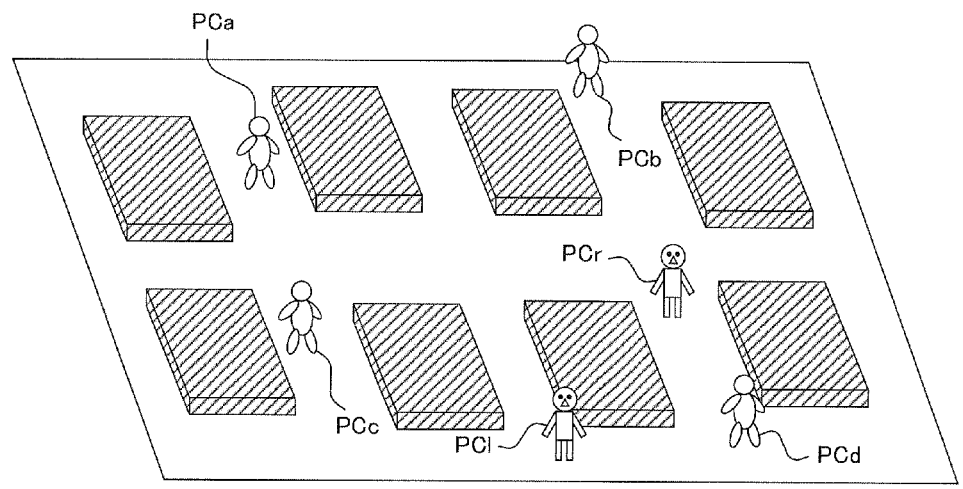
FIG. 9 shows a non-limiting example of the virtual space at another point in time.
Figure 10:
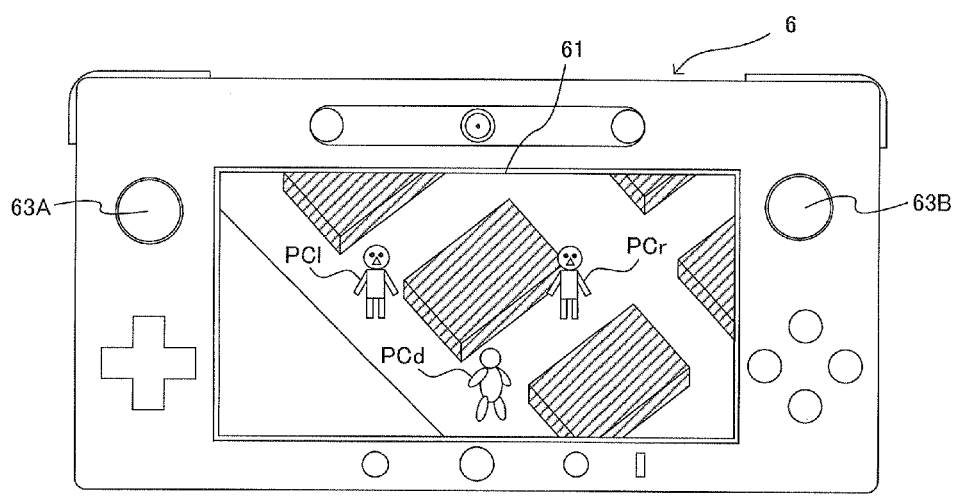
FIG. 10 shows a non-limiting example of the terminal game image.

When the game advances from the point in time in FIG. 6 and when the player characters PCa, PCb, PCc, PCd, PCl, and PCr move to positions shown in FIG. 9, a terminal game image as shown in FIG. 10 is displayed on the LCD 61 of the terminal device 6. Also in FIG. 10, the player characters PCl and PCr are displayed in the terminal game image such that the halfway point between the player characters PCl and PCr is located almost at the center of the screen. Furthermore, in the terminal game image, the player character PCl is displayed on the left side with regard to the displayed position of the player character PCr. Such manner of displaying is achieved by rotating the virtual camera in accordance with the movements of the player characters PCl and PCr. A method for controlling the virtual camera will be described in detail later.

Figure 11:
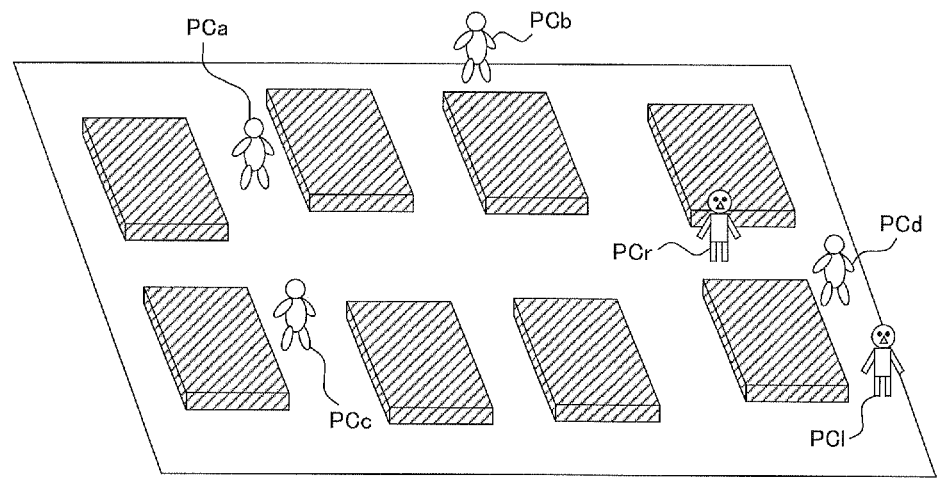
FIG. 11 shows a non-limiting example of the virtual space at still another point in time.
Figure 12:
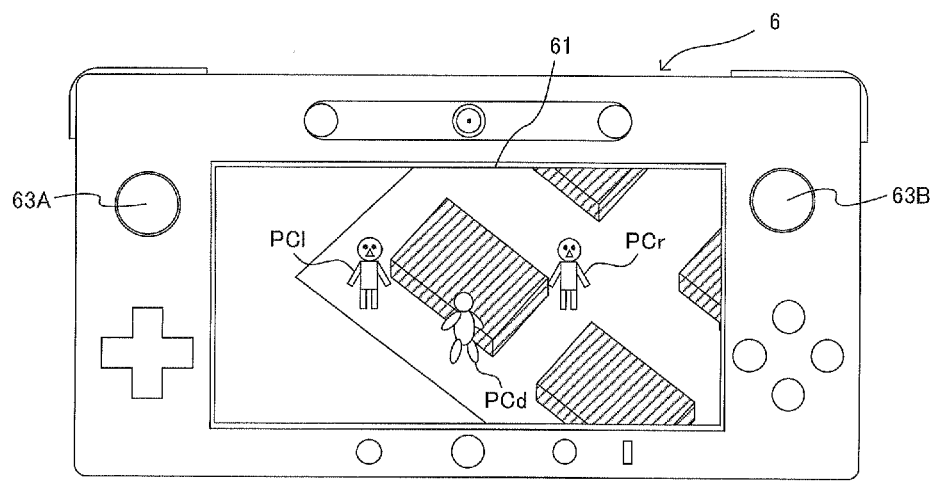
FIG. 12 shows a non-limiting example of the terminal game image.

When the game advances from the point in time in FIG. 9 and when the player characters PCa, PCb, PCc, PCd, PCl, and PCr move to positions shown in FIG. 11, a terminal game image as shown in FIG. 12 is displayed on the LCD 61 of the terminal device 6. Also in FIG. 12, the player characters PCl and PCr are displayed in terminal game image such that the halfway point between the player characters PCl and PCr is located almost at the center of the screen. Furthermore, in the terminal game image, the player character PCl is displayed on the left side with regard to the displayed position of the player character PCr.

As described above, in the exemplary embodiment, the player character PCl is displayed in the terminal game image on the left side with regard to the displayed position of the player character PCr regardless of the positions of the player characters PCl and PCr, through a rotation of the virtual camera in accordance with the movements of the player characters PCl and PCr. Therefore, no matter where the player characters PCl and PCr move, the player character PCl associated with the analog stick 63A disposed on the left side of the LCD 61 is displayed at a position closer to the left end of the screen, and the player character PCr associated with the analog stick 63B disposed on the right side of the LCD 61 is displayed at a position closer to the right end of the screen. Therefore, the player U can easily and intuitively understand the respective associative relationships between the analog sticks 63A, 63B and the player characters PCl, PCr, no matter where the player characters PCl and PCr move.

Figure 13:
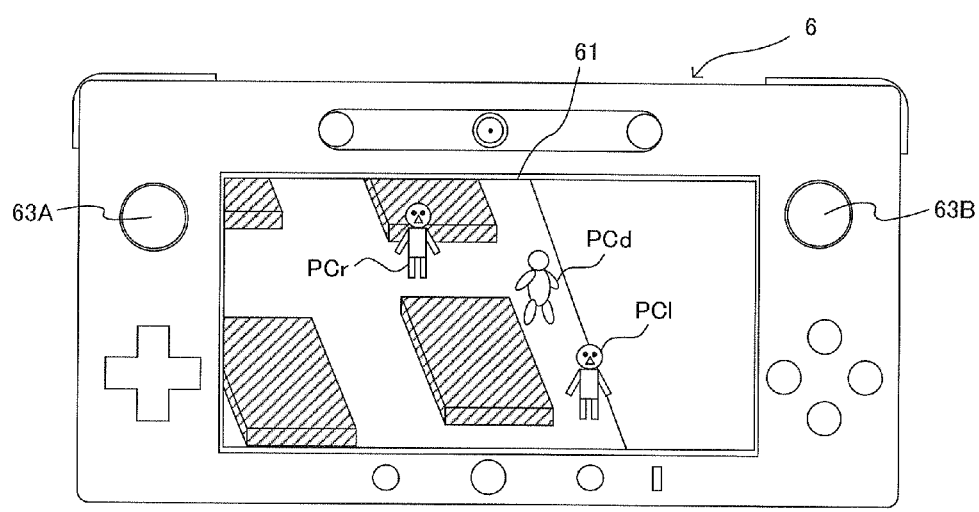
FIG. 13 shows a comparative example of the terminal game image.

As a comparative example for describing the advantageous effect of the exemplary embodiment, FIG. 13 shows a terminal game image in a case where the virtual camera is not rotated in a situation corresponding to that in FIG. 11. In the terminal game image in FIG. 13, the player character PCl associated to the analog stick 63A disposed on the left side of the LCD 61 is displayed at a position closer to the right end of the screen, and the player character PCr associated with the analog stick 63B disposed on the right side of the LCD 61 is displayed at a position closer to the left end of the screen. Therefore, the player U cannot intuitively understand the respective associative relationships between the analog sticks 63A, 63B and the player characters PCl, PCr; and thereby it becomes difficult to move the player characters PCl and PCr to desired locations. On the other hand, according to the exemplary embodiment, operability can be improved through a rotation of the virtual camera in accordance with the movements of the player characters PCl and PCr.

Next, detailed action of the game system 1 to achieve the game will be described with reference to FIG. 14 to FIG. 19.

Figure 14:
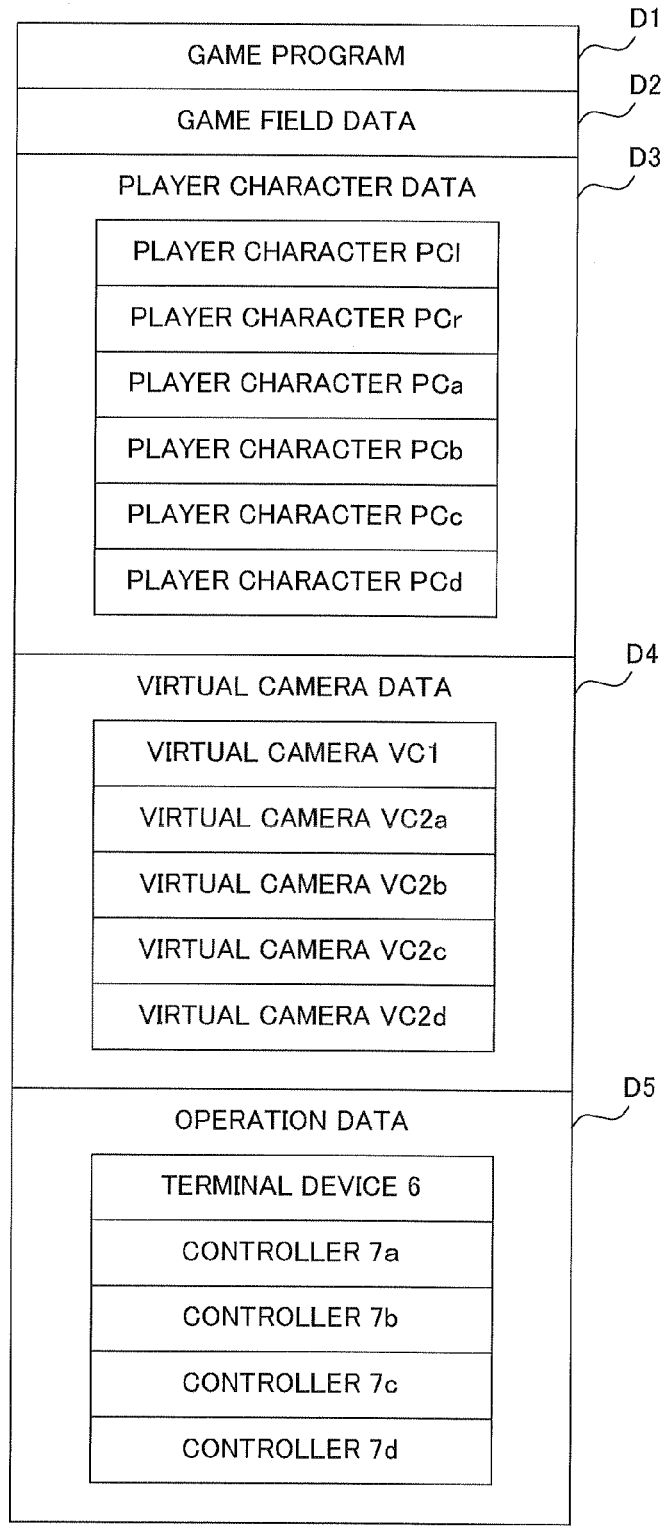
FIG. 14 shows non-limiting examples of various data stored on an external main memory 12.

FIG. 14 shows examples of various data stored in the external main memory 12 of the game apparatus body 5 when the game is executed.

A game program D1 is a program that causes the CPU 10 of the game apparatus body 5 to execute a game process for achieving the game. The game program D1 is loaded, for example, from the optical disc 4 to the external main memory 12.

Game field data D2 is data representing the game field, and patterns and shapes of obstacles arranged on the game field.

Player character data D3 is data related to the play characters PCa, PCb, PCc, PCd, PCl, and PCr, and is data representing a shape, pattern, position, attitude, and the like of each of the player characters.

Figure 17:
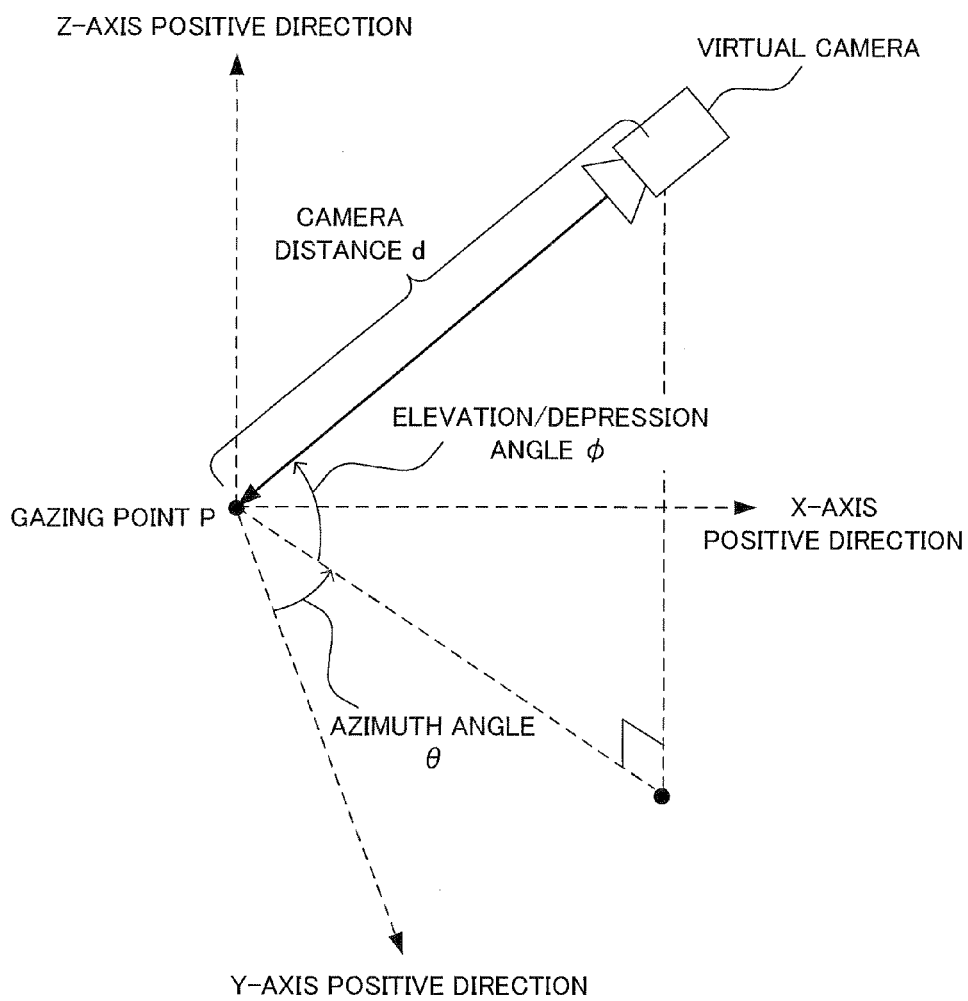
FIG. 17 shows a non-limiting example of a method for defining attitude and position of a virtual camera.

Virtual camera data D4 is data related to virtual cameras (a virtual camera VC1 for generating the terminal game image, and virtual cameras VC2a, VC2b, VC2c, and VC2d for generating four sub images consisting the monitor game image) used for generating the game image. The camera data D4 is data representing a position, attitude, angle of view, and the like of each of the virtual cameras. It should be noted that, as it will be described later, the positions and attitudes of the virtual cameras may be represented by, for example, a coordinate value of a gazing point P, an azimuth angle θ, an elevation/depression angle φ, and a camera distance d (FIG. 17).

Operation data D5 is operation data that is periodically transmitted from each of the terminal device 6 and the controllers 7a, 7b, 7c, and 7d.

Next, with reference to flowcharts in FIG. 15 and FIG. 16, a flow of the game process executed based on the game program D1 by the CPU 10 of the game apparatus body 5 will be described.

Figure 15:
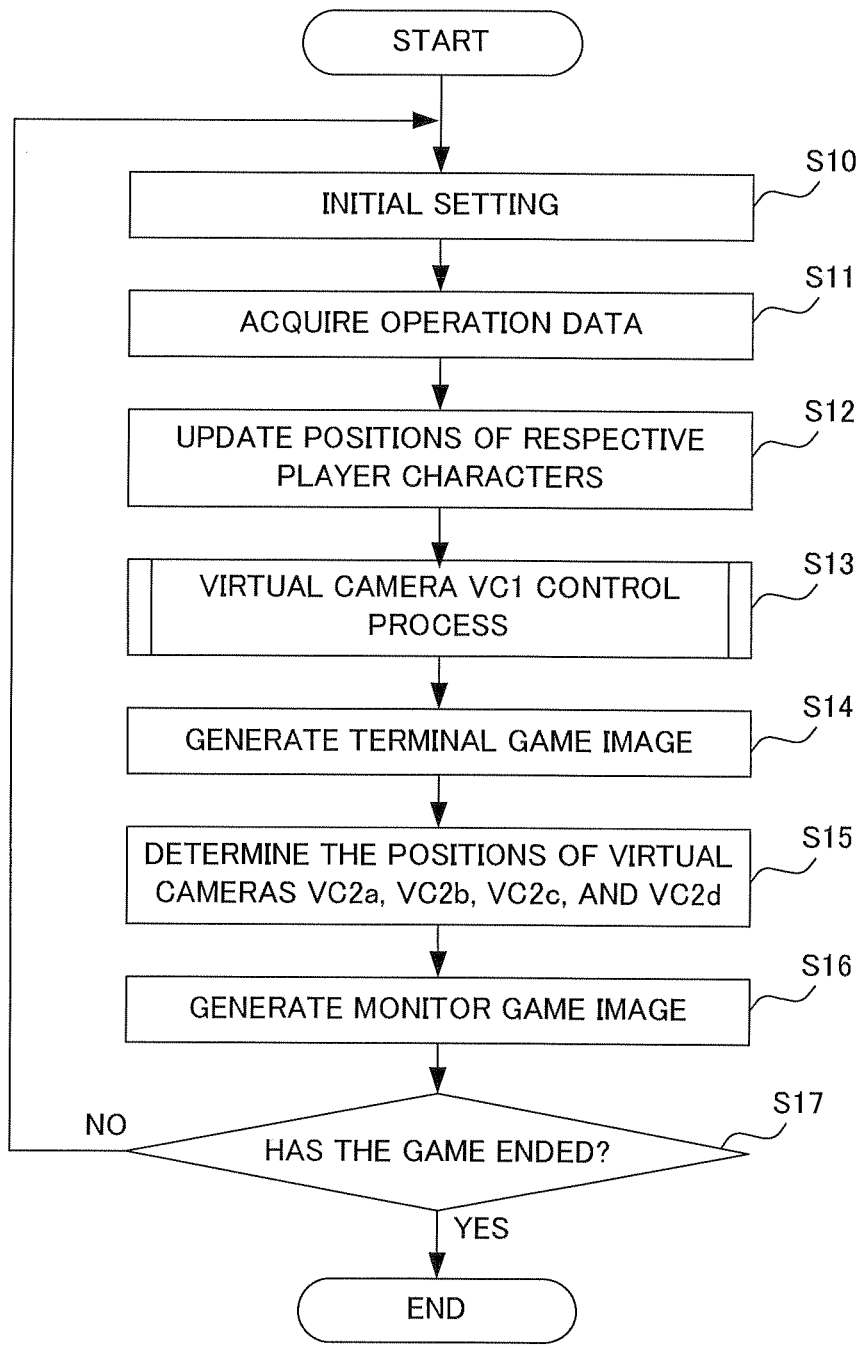
FIG. 15 is a non-limiting example of a flowchart showing a flow of a game process.

When execution of the game program D1 is initiated, first, at step S10 in FIG. 15, the CPU 10 configures initial settings. In the initial settings, a process for arranging the player characters PCa, PCb, PCc, PCd, PCl, and PCr to initial positions in the virtual space, and the like are conducted.

At step S11, the CPU 10 acquires the operation data D5 from the terminal device 6 and the controllers 7a, 7b, 7c, and 7d.

At step S12, the CPU 10 updates the positions of the player characters PCa, PCb, PCc, PCd, PCl, and PCr in the virtual space based on the operation data D5 (i.e., updates the player character data D3). Specifically, the CPU 10 moves the player character PCl in a direction in accordance with a direction inputted through the analog stick 63A of the terminal device 6. For example, when the stick part of the analog stick 63A is slid or tilted in the rightward direction, the player character PCl is moved on the game field so as to head toward the rightward direction on the screen. Similarly, the CPU 10 moves the player character PCr in a direction in accordance with a direction inputted through the analog stick 63B of the terminal device 6. Furthermore, the CPU 10 moves the player character PCa in a direction in accordance with a direction inputted through a cross button of the controller 7a, moves the player character PCb in a direction in accordance with a direction inputted through a cross button of the controller 7b, moves the player character PCc in a direction in accordance with a direction inputted through a cross button of controller 7c, and moves the player character PCd in a direction in accordance with a direction inputted through a cross button of controller 7d.

At step S13, the CPU 10 performs a virtual camera VC1 control process. The virtual camera VC1 control process is a process for determining the position and attitude of the virtual camera VC1 in order to generate a terminal game image (i.e., updating the virtual camera data D4). In the following, details of the virtual camera VC1 control process will be described with reference to the flowchart in FIG. 16. In the exemplary embodiment, the position and attitude of the virtual camera VC1 are determined by calculating the coordinate value of the gazing point P, the azimuth angle θ, the elevation/depression angle φ, and the camera distance d as shown in FIG. 17.

Figure 16:
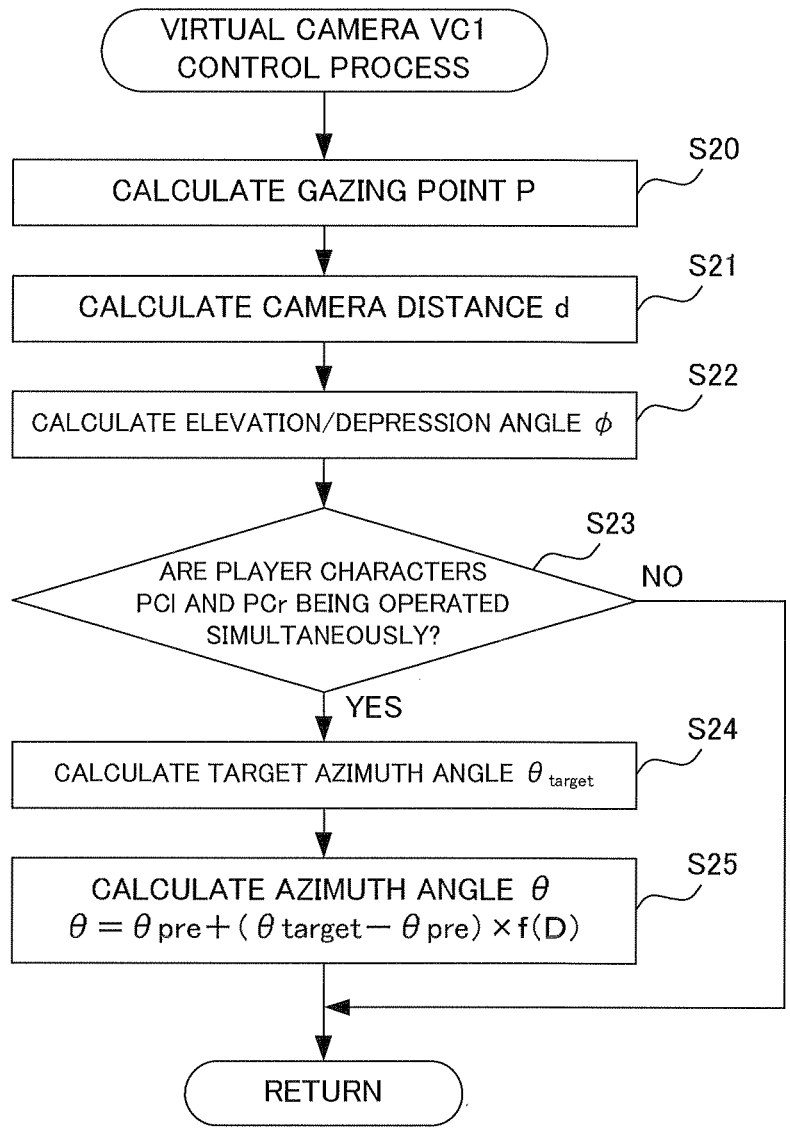
FIG. 16 is a non-limiting example of a flowchart showing details of a virtual camera VC1 control process.

At step S20 in FIG. 16, the CPU 10 calculates the coordinate value of the gazing point P. The gazing point P is preferably set at a halfway point between the position of the player character PCl and the position of the player character PCr.

At step S21, the CPU 10 calculates the camera distance d. The camera distance d is a distance from the virtual camera to the gazing point P. In order to have both the player characters PCl and PCr displayed on the screen even when the player characters PCl and PCr become distant from each other, the camera distance d is preferably set to be a value that becomes larger as the distance (a character distance D described later) between the player characters PCl and PCr becomes larger. As another technique for having both the player characters PCl and PCr displayed on the screen even when the player characters PCl and PCr become distant from each other, the angle of view of the virtual camera may be widened as the distance between the player characters PCl and PCr becomes larger.

At step S22, the CPU 10 calculates the elevation/depression angle φ. The elevation/depression angle φ is an angle between a line-of-sight direction of the virtual camera (i.e., a straight line connecting the virtual camera and the gazing point) and an XY plane (i.e., a horizontal plane in a virtual world, or a game field). The elevation/depression angle φ is set, for example, at a value larger than 0° but smaller than 90°, and is preferably set at a value that becomes larger as the distance (the character distance D) between the player characters PCl and PCr becomes larger.

At step S23, the CPU 10 determines whether or not the player characters PCl and PCr are being simultaneously operated. Specifically, the CPU 10 refers to operation data of the terminal device 6 included in the operation data D5, and determines that the player characters PCl and PCr are simultaneously being operated if directions are inputted from both of the analog sticks 63A and 63B, and determines that the player characters PCl and PCr are not simultaneously being operated if otherwise (e.g., if a direction is inputted from only either one of the analog sticks 63A and 63B). If it is determined that the player characters PCl and PCr are simultaneously being operated, the process advances to step S24, and if otherwise, the process advances to step S14 in FIG. 15.

At step S24, the CPU 10 calculates a target azimuth angle $\theta_{target}$. In order to avoid rapid changes to the azimuth angle θ of the virtual camera VC1, a technique of gradually bringing the azimuth angle θ of the virtual camera VC1 close to the target azimuth angle $\theta_{target}$ is employed in the exemplary embodiment. The azimuth angle θ is an angle between a straight line obtained by projecting the line-of-sight direction (a straight line connecting the virtual camera and the gazing point) of the virtual camera onto the XY plane, and an YZ plane (i.e., a vertical plane in the virtual world). The target azimuth angle $\theta_{target}$ is calculated in accordance with the positions of the player characters PCl and PCr. Specifically, for example, when the angle between the YZ plane and the straight line connecting the player characters PCl and PCr is defined as $\theta_c$ as shown in FIG. 18, the CPU 10 calculates the $\theta_{target}$ as $\theta_c - 90°$.

At step S25, the CPU 10 calculates the azimuth angle θ of the virtual camera VC1 in accordance with an azimuth angle $\theta_{pre}$ (an azimuth angle θ of the virtual camera VC1 in an immediately preceding frame), the target azimuth angle $\theta_{target}$, and a variable f(D) in a manner shown in formula (1) below.

$$\theta = \theta_{pre} + (\theta_{target} - \theta_{pre}) \times f(D) \quad (1)$$

Figure 18:
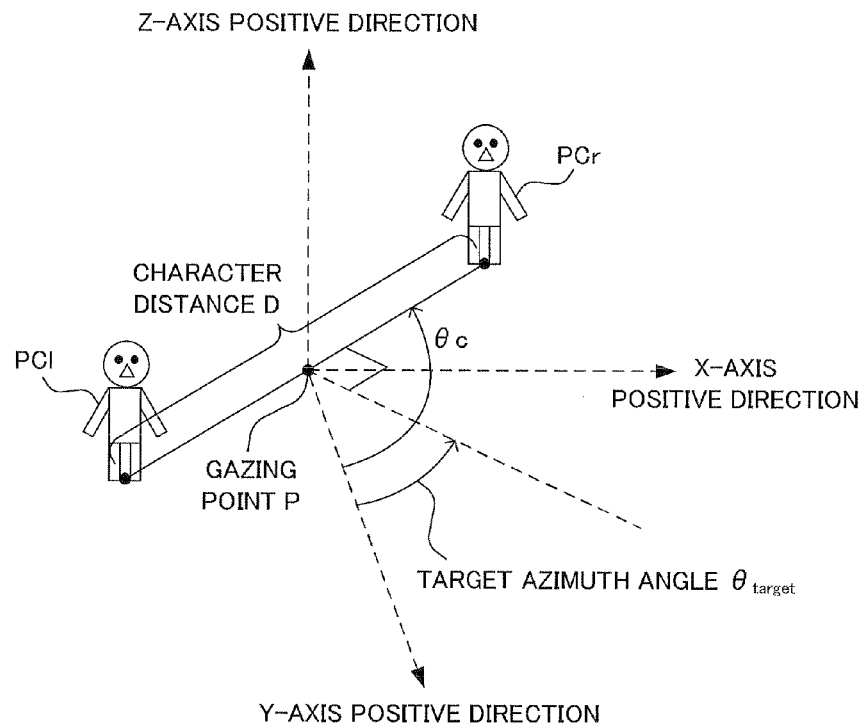
FIG. 18 shows a non-limiting example of a method for determining a target azimuth angle $\theta_{target}$.

The variable f(D) is a variable that changes in accordance with the distance between the player characters PCl and PCr (the character distance D shown in FIG. 18). For example, as shown in FIG. 19, the variable f(D) becomes V1 (e.g., 0.01) when the character distance D is 0, shifts from 0.01 closer to 0.05 as the character distance D shifts from 0 closer to Dth, and becomes V2 (e.g., 0.05) when the character distance D is Dth (e.g., 100) or larger.

As it is obvious from formula (I) described above, f(D) indicates a ratio at which the azimuth angle θ shifts from the azimuth angle $\theta_{pre}$ to the target azimuth angle $\theta_{target}$. For example, when f(D) is 0.05, the azimuth angle θ shifts from the azimuth angle $\theta_{pre}$ closer to the target azimuth angle $\theta_{target}$ at 5% of the difference between the azimuth angle $\theta_{pre}$ and the target azimuth angle $\theta_{target}$. Similarly, when f(D) is 0.01, the azimuth angle θ shifts from the azimuth angle $\theta_{pre}$ to the target azimuth angle $\theta_{target}$ at 1% of the difference between the azimuth angle $\theta_{pre}$ and the target azimuth angle $\theta_{target}$.

Figure 19:
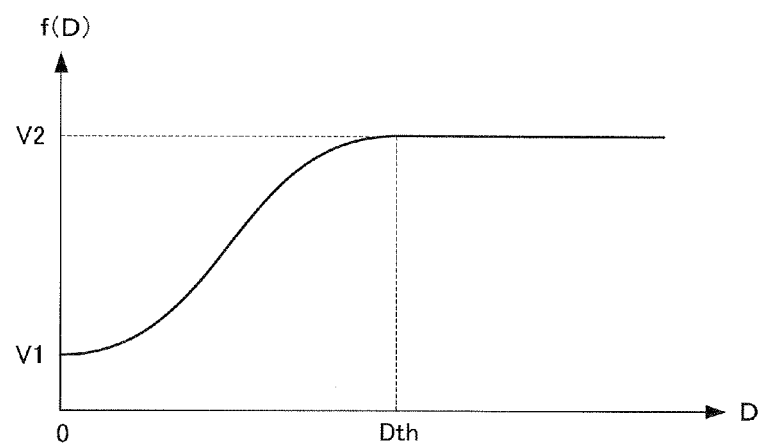
FIG. 19 shows a non-limiting example of a correspondence relationship between character distance D and variable f(D)

As shown in FIG. 19, the ratio at which the azimuth angle θ shifts from the azimuth angle $\theta_{pre}$ closer to the target azimuth angle $\theta_{target}$ becomes smaller as the character distance D becomes smaller, since f(D) becomes a smaller value. This is set in such a manner because, when the character distance D is small, the direction of the straight line connecting the player characters PCl and PCr rapidly changes in association with the movements of the player characters PCl and PCr, and thereby resulting in a rapid change in the target azimuth angle $\theta_{target}$. When the target azimuth angle $\theta_{target}$ rapidly changes, if a large value is set for the ratio at which the azimuth angle $\theta$ shifts from the azimuth angle $\theta_{pre}$ closer to the target azimuth angle $\theta_{target}$, the operation becomes difficult since the azimuth angle $\theta$ also rapidly changes and the game field viewed by the player U rapidly rotates. Therefore, in the exemplary embodiment, such a problem is prevented by setting f(D) at a smaller value as the character distance D becomes smaller.

When the virtual camera VC1 control process ends, the process advances to step S14 in FIG. 15.

At step S14, the CPU 10 generates the terminal game image by using the virtual camera VC1. For example, a view matrix corresponding to the virtual camera VC1 is generated and the virtual space is rendered by using the view matrix based on the coordinate value of the gazing point P, the azimuth angle $\theta$, the elevation/depression angle $\phi$, and the camera distance d determined at step S13. One portion or all of the processes for generating the terminal game image may be conducted on the GPU 32 in accordance with an instruction from the CPU 10. The generated terminal game image is transmitted from the game apparatus body 5 to the terminal device 6 and displayed on the LCD 61.

At step S15, the CPU 10 determines the positions of the four virtual cameras VC2a, VC2b, VC2c, and VC2d to generate the monitor game image (i.e., updates the virtual camera data D4). Specifically, the position of the virtual camera VC2a is determined in accordance with the position of the player character PCa, such that the player character PCa is located almost at the center of the field of view of the virtual camera VC2a. Similarly, the position of the virtual camera VC2b is determined in accordance with the position of the player character PCb, such that the player character PCa is located almost at the center of the field of view of the virtual camera VC2b. Similarly, the position of the virtual camera VC2c is determined in accordance with the position of the player character PCc, and the position of the virtual camera VC2d is determined in accordance with the position of the player character PCd. In the exemplary embodiment, the attitudes of the virtual cameras VC2a, VC2b, VC2c, and VC2d are fixed (i.e., the line-of-sight directions of the virtual cameras VC2a, VC2b, VC2c, and VC2d is a constant direction).

At step S16, the CPU 10 generates the monitor game image by using the four virtual cameras VC2a, VC2b, VC2c, and VC2d. Specifically, the sub image for the player A is generated by using the virtual camera VC2a, the sub image for the player B is generated by using the virtual camera VC2b, the sub image for the player C is generated by using the virtual camera VC2c, and the sub image for the player D is generated by using the virtual camera VC2d. Then, these 4 sub images are combined to generate the monitor game image. One portion or all of the processes for generating the monitor game image may be conducted on the GPU 32 in accordance with an instruction from the CPU 10. The generate monitor game image is transmitted from the game apparatus body 5 to the monitor 2 and displayed on the monitor 2.

At step S17, the CPU 10 determines whether the game has ended. If the game has not ended, the process returns to step S10, and if the game has ended, the execution of the game program D1 ends.

As described above, in the exemplary embodiment, the virtual camera VC1 is rotated in accordance with the positions of the player characters PCl and PCr, such that the player character PCr is displayed on the right side with regard to the displayed position of the player character PCl in the terminal game image (i.e., the virtual camera VC1 is rotated about a vertical line that passes through the gazing point P). Therefore, since the player character PCr is displayed on the right side with regard to the displayed position of the player character PCl in the terminal game image, the player U can easily and intuitively understand that the player character PCl is associated with the analog stick 63A and that the player character PCr is associated with the analog stick 63B.

The advantageous effect as described above becomes particularly significant in a game in which the player characters PCl and PCr can individually (i.e., independent from each other) move in any direction in the game field, and in which a game image looking down on the player characters PCl and PCr from the sky of the game field is displayed, as in the exemplary embodiment. This is because, in such a game, the respective associative relationships between the analog sticks 63A, 63B and the player characters PCl, PCr often becomes difficult to understand in mid-course of playing the game.

In addition, in the exemplary embodiment, since the player character PCr is displayed on the right side with regard to the displayed position of the player character PCl in the terminal game image, the player U can bring the player characters PCl and PCr close together by sliding or tilting the analog stick 63A in the right direction and sliding or tilting the analog stick 63B in the left direction, regardless of the positions of the player characters PCl and PCr. Therefore, an operation of bringing the two player characters PCl and PCr close to each other becomes easy, and thereby the player U can efficiently catch the player characters PCa, PCb, PCc, and PCd by performing a pincer approach on the player characters PCa, PCb, PCc, or PCd through the usage of the two player characters PCl and PCr.

Furthermore, in the exemplary embodiment, the virtual camera VC1 is rotated in accordance with the positions of the player characters PCl and PCr when the player characters PCl and PCr are simultaneously being operated, but the virtual camera VC1 is not rotated when only either one of the player characters PCl and PCr is being operated. This is because the possibility of misunderstanding the respective associative relationships between the analog sticks 63A, 63B and the player characters PCl, PCr is low in mid-course of operating only either one of the player characters PCl and PCr.

In addition, if the virtual camera VC1 were to be rotated when only either one of the player characters PCl and PCr is being operated, it can become difficult to linearly move a player character to a desired point since the game field rotates in accordance with the movement of the player character that is being operated in the terminal game image. However, such problem can be prevented by rotating the virtual camera VC1 when only either one of the player characters PCl and PCr is being operated, as in the exemplary embodiment.

It should be noted that the above described embodiment is merely one embodiment, and various modifications are conceivable.

Figure 20:
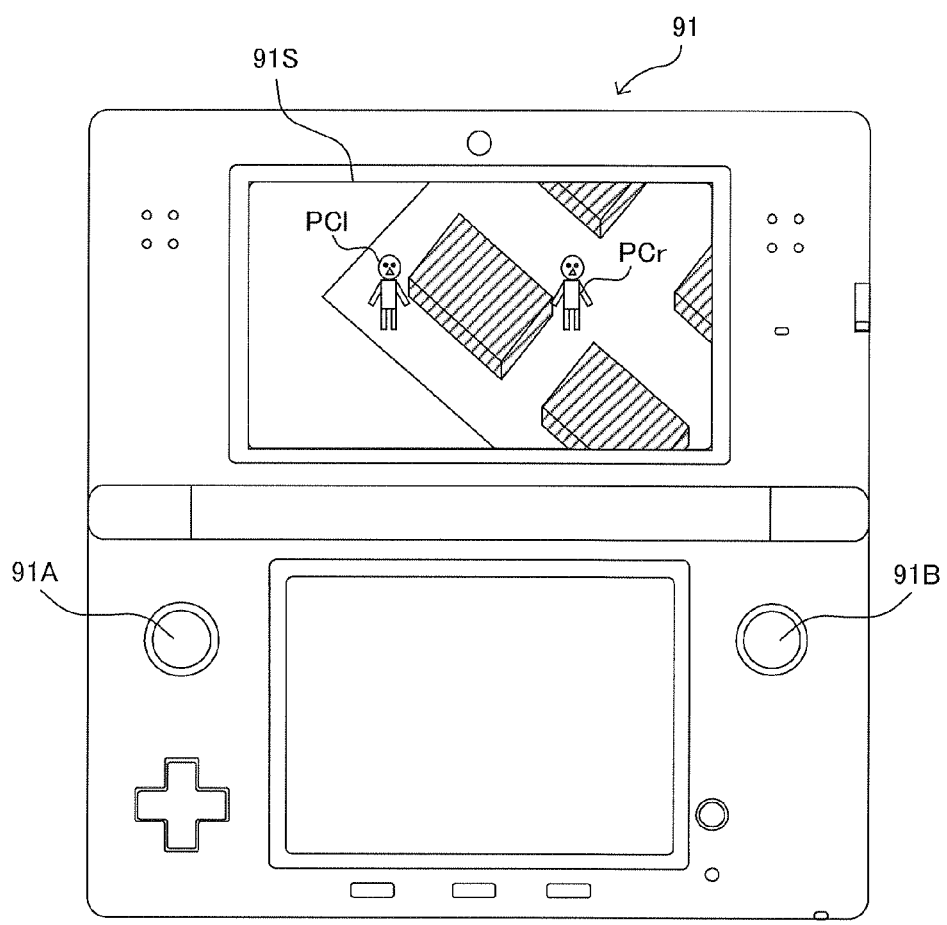
FIG. 20 is a perspective view showing a game system according to an alternate example.

For example, instead of the game system 1 shown in FIG. 1, a handheld gaming device 91 shown in FIG. 20 may be used. The handheld gaming device 91 includes an LCD 91S, and analog sticks 91A and 91B. A player can move the player character PCl by using the analog stick 91A, and can move the player character PCr by using the analog stick 91B. In addition, the virtual camera is rotated in accordance with the positions of the player characters PCl and PCr, such that the player character PCr is displayed on the right side with regard to the displayed position of the player character PCl in the game image displayed on the LCD 91S.

Figure 21:
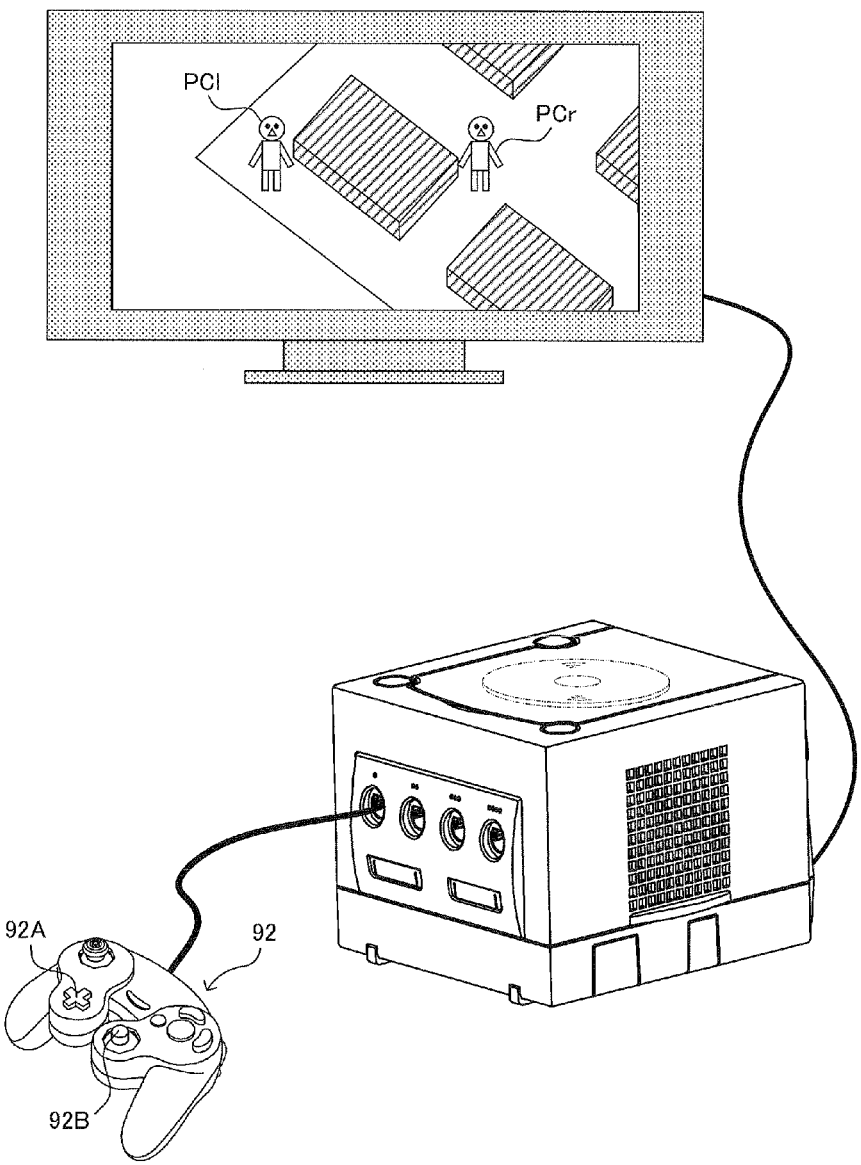
FIG. 21 is a perspective view showing a game system according to another alternate example.

Furthermore, for example, instead of the game system 1 shown in FIG. 1, a game system shown in FIG. 21 may be used. A controller 92 connected to a game apparatus body includes a cross button 92A and an analog stick 92B. A player can move the player character PCl by using the cross button 92A, and can move the player character PCr by using the analog stick 92B. In addition, the virtual camera is rotated in accordance with the positions of the player characters PCl and PCr, such that the player character PCr is displayed on the right side with regard to the displayed position of the player character PCl in the game image displayed on a monitor. Also in this case, since the player character PCr associated with the analog stick 92B operated by the right hand of the player is displayed on the right side with regard to the displayed position of the player character PCl associated with the cross button 92A operated by the left hand of the player, the player can easily and intuitively understand the respective associative relationships between the player characters PCl, PCr, and the cross button 92A and the analog stick 92B.

Furthermore, in the embodiment described above, although the virtual camera VC1 is not rotated when only either one of the player characters PCl and PCr is being operated, in another embodiment, the virtual camera VC1 may be rotated also when only either one of the player characters PCl and PCr is being operated.

Furthermore, in the embodiment described above, although a technique of gradually bringing the azimuth angle $\theta$ of the virtual camera VC1 close to the target azimuth angle $\theta_{target}$ is employed, in another embodiment, the azimuth angle $\theta$ of the virtual camera VC1 may be set to constantly be identical to the target azimuth angle $\theta_{target}$.

Furthermore, in the embodiment described above, although a single player (the player U) is operating the terminal device 6, in another embodiment, the terminal device 6 may be operated by a plurality of players. Specifically, a certain player may move the player character PCl by operating the analog stick 63A, and at the same time, another player may move the player character PCr by operating the analog stick 63B.

Furthermore, in the embodiment described above, although the player U moves the two player objects PCl and PCr by using two direction input sections, in another embodiment, three player objects may be moved by using three direction input sections. In this case, the virtual camera VC1 may be rotated in accordance with the positions of the three player objects.

Furthermore, in the embodiment described above, the player character PCl is moved by using the analog stick 63A disposed on the left side of the LCD 61, and the player character PCr is moved by using the analog stick 63B disposed on the right side of the LCD 61. However, in another embodiment, a certain player character (hereinafter, referred to as an upper player character) may be moved by using a direction input section disposed on the upper side of a display section, and another player character (hereinafter, referred to as a lower player character) may be moved by using a direction input section disposed on the lower side of the display section. In this case, the virtual camera VC1 may be rotated in accordance with the positions of the upper player character and the lower player character, such that the upper player character is displayed on the upper side with regard to the displayed position of the lower player character in the game image displayed on the display section.

Furthermore, in the above described embodiment, although the multiple processes shown in FIG. 15 and FIG. 16 are executed on a single computer (the CPU 10), in another embodiment, these multiple processes may be distributed and executed on multiple computers. Furthermore, in still another embodiment, one portion of these multiple processes may be achieved in a dedicated circuit.

Furthermore, in the above described embodiment, although the multiple processes shown in FIG. 15 and FIG. 16 are executed on a single information processing apparatus (the game apparatus body 5), in another embodiment, these multiple processes may be distributed and executed on multiple information processing apparatuses (e.g., the game apparatus body 5 and a server device, or the game apparatus body 5 and the terminal device 6).

Furthermore, in the above described embodiment, although the game program D1 is provided to the game apparatus body 5 from the optical disc 4, in another embodiment, the game program D1 may be provided to the game apparatus body 5 from any other computer readable storage media (e.g., CD-ROM, semiconductor memory, and the like). Furthermore, in still another embodiment, the game program D1 may be stored in advance in a nonvolatile memory (the ROM/RTC 13, the flash memory 17) inside the game apparatus body 5. Furthermore, in still another embodiment, the game program D1 may be supplied to the game apparatus body 5 from another information processing apparatus (game apparatus, server device).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain exemplary embodiments have been described in detail, the foregoing description is in all aspects illustrative and not restrictive. It will be understood that numerous other modifications and variations can be devised.

What is claimed is:

1. A game system comprising:
an object control section configured to individually move, in a virtual space, a plurality of first objects each associated to a direction input section among a plurality of direction input sections disposed on a first operating device, in accordance with directions inputted through the associated direction input sections;
a virtual camera control section configured to control a first virtual camera in the virtual space in accordance with positions of the plurality of the first objects in the virtual space; and
a game image generation section configured to generate a first game image based on the first virtual camera, wherein
the virtual camera control section includes a rotation control section configured to automatically rotate the first virtual camera in accordance with the positions of the plurality of the first objects in the virtual space, such that a certain one of the first objects in the first game image is displayed on a predetermined side with regard to a displayed position of another one of the first objects irrespective of whether the positions of the plurality of objects in the virtual space are such that the certain one of the first objects is on the predetermined side with regard to the another one of the first objects, wherein the certain one of the first objects and the another one of the first objects are each associated to a respective one of the plurality of direction input sections.

2. The game system according to claim 1, wherein:
the first operating device includes a first display section;
the first game image is displayed on the first display section;
the plurality of the direction input sections include a first direction input section disposed on a left side of the first display section and a second direction input section disposed on a right side of the first display section;
the object control section moves a left object among the plurality of the first objects in accordance with a direction inputted through the first direction input section, and also moves a right object among the plurality of the first objects in accordance with a direction inputted through the second direction input section; and
the rotation control section rotates the first virtual camera such that the right object is displayed in the first game image on a right side with regard to a displayed position of the left object.

3. The game system according to claim 1, wherein the virtual camera control section controls an angle of view or a position of the virtual camera such that the plurality of the first objects are all displayed.

4. The game system according to claim 2, wherein the first operating device further includes a reception section configured to receive the first game image from a game apparatus including the object control section, the virtual camera control section, and the game image generation section.

5. The game system according to claim 4, wherein:
the object control section controls, in the virtual space, a plurality of second objects each associated to a second operating device among a plurality of second operating devices, in accordance with inputs from the associated second operating devices;
the game image generation section generates a second game image including the plurality of the second objects based on at least one second virtual camera; and the game apparatus further includes an image output section configured to output the second game image to a display device.

6. The game system according to claim 2, wherein the first operating device is a handheld gaming device including the object control section, the virtual camera control section, and the game image generation section.

7. The game system of claim 1, wherein the positions of the plurality of the first objects in the virtual space are such that the certain one of the first objects not on the predetermined side with regard to the another one of the first objects.

8. A game system comprising:
an object control section configured to individual move, in virtual space, a plurality of first objects each associated to a direction input section among as plurality of direction input sections disposed on a first operating device, in accordance with directions inputted through the associated direct input sections;
a virtual camera control section configured to control a first virtual camera in the virtual space in accordance with positions of the plurality of the first objects in the virtual space; and
a game image generation configured to generate a first game image based on the first virtual camera, wherein
the virtual camera control section includes a rotation control section configured to rotate the first virtual camera in accordance with the positions of the plurality of the first objects in the virtual space, such that a certain one of the first objects in the first game image is displayed on a predetermined side with regard to a displayed position of another one of the first objects, wherein the certain one of the first objects and another one of the first objects are each associated to a respective one of the plurality of direction input sections, wherein:
the first operating device includes a first display section;
the game image is displayed on the first display section;
the plurality of the direction input sections include a first direction input section disposed on a left side of the first display section an a second direction input section disposed on a right side of the first display section;
the object control section moves a left object among the plurality of the first objects in accordance with a direction inputted through the first direction input section, and also moves a right object among the plurality of the first objects in accordance with a direction inputted through the second direction input section; and
the rotation control section rotates the first virtual camera such that the right object is displayed in the first game image on a right side with regard to a displayed position of the left object, and
wherein the rotation control section adjusts a rotational velocity of the first virtual camera in accordance with a distance between the right object and the left object.

9. A game system comprising:
an object control section configured to individually move, in virtual space, a plurality of first objects each associated to direction input section among a plurality of direction input sections disposed on a first operating device, in accordance with directions inputted through the associated direction input sections;
a virtual camera control section configured to control a first virtual camera in the virtual space in accordance with positions of the plurality of the first objects in the virtual space; and
a game image generation section configured to generate a first game image based on the first virtual camera, wherein the virtual camera control section includes a rotation control section configured to rotate the first virtual camera in accordance with the positions of the plurality of the first objects in the virtual space, such that a certain one of the first objects in the first game image is displayed on a predetermined side with regard to a displayed position of another one of the first objects, wherein the certain one of the first objects and the another one of the first objects are each associated to a respective one of the plurality of direction input sections, wherein:

the first operating device includes a first display section;

the first game image is displayed on the first display section;

the plurality of the direction input sections include a first direction input section disposed on a left side of the first display section and a second direction input section disposed on a right side of the first display section;

the object control section moves a left object among the plurality of the first objects in accordance with a direction inputted through the first direction input section, and also moves a right object among the plurality of the first objects in accordance with a direction inputted through the second direction input section; and the rotation control section rotates the first virtual camera such that the right object is displayed in the first game image on a right side with regard to a displayed position of the left object, the game system, further comprising a simultaneous operation determination section configured to determine whether the right object and the left object are simultaneously in motion, wherein the rotation control section rotates the first virtual camera when the right object and the left object are simultaneously in motion, and does not rotate the first virtual camera when only either one of the right object and the left object is in motion.

10. A game processing method executed by a computer, the method comprising:

individually moving, in a virtual space, a plurality of first objects each associated to a direction input section among a plurality of direction input sections disposed on a first operating device, in accordance with directions inputted through the associated direction input sections;

controlling a first virtual camera in the virtual space in accordance with positions of the plurality of the first objects in the virtual space; and generating a first game image based on the first virtual camera, wherein when the controlling of the first virtual camera is performed, automatically rotating of the first virtual camera is performed in accordance with the positions of the plurality of the first objects in the virtual space, such that a certain one of the first objects in the first game image is displayed on a predetermined side with regard to a displayed position of another one of the first objects irrespective of whether the positions of the plurality of objects in the virtual space are such that the certain one of the first objects is on the predetermined side with regard to the another one of the first objects, wherein the certain one of the first objects and the another one of the first objects are each associated to a respective one of the plurality of direction input sections.

11. The game processing method according to claim 10, wherein the first operating device includes a first display section;

the first game image is displayed on the first display section;

the plurality of the direction input sections include a first direction input section disposed on a left side of the first display section and a second direction input section disposed on a right side of the first display section;

when the moving of the plurality of the first objects is performed, moving is performed on a left object among the plurality of the first objects in accordance with a direction inputted through the first direction input section, and moving is performed on a right object among the plurality of the first objects in accordance with a direction inputted through the second direction input section; and when the rotating of the first virtual camera is performed, rotating is performed on the first virtual camera such that the right object is displayed in the first game image on a right side with regard to a displayed position of the left object.

12. The game processing method according to claim 10, wherein when the controlling of the first virtual camera is performed, controlling of an angle of view of a position of the virtual camera is performed such that the plurality of the first objects are all displayed.

13. The game processing method according to claim 11, wherein the first operating device further includes a reception section for receiving the first game image from a game apparatus that includes the computer.

14. The game processing method according to claim 13, wherein when the controlling of the plurality of the first objects is performed, controlling is performed in the virtual space on a plurality of second objects each associated to a second operating device among a plurality of second operating devices, in accordance with inputs from the associated second operating devices;

when the generating of the first game image is performed, generating of a second game image that includes the plurality of the second objects is performed based on at least one second virtual camera; and the game apparatus further includes an image output section for outputting the second game image to a display device.

15. The game processing method according to claim 11, wherein the first operating device is a handheld gaming device that includes the computer.

16. A game processing method executed by a computer, the method comprising:

individually moving, in virtual space, a plurality of first objects each associated to a direction input section moving a plurality of direction input sections disposed on a first operating device; in accordance with directions inputted through the associated direction input sections;

controlling a first virtual camera in the virtual space in accordance with positions of the plurality of the first objects in virtual space; and generating a first game image based on the first virtual camera, wherein when the controlling of the first virtual camera is performed, rotating of the first virtual camera is performed in accordance with the positions of plurality of the first objects in the virtual space, such that a certain one of the objects in the first game image is displayed on a predetermined side with regard to a displayed position of another one of the first objects, wherein the certain one of the first objects and the another one of the first objects are each associated to a respective one of the plurality of direction input sections, wherein the first operating device includes a first display section;

the first game image is displayed on the first display section;

the plurality of direction input sections include first direction input section disposed on a left side of the first display section and a second direction input section disposed on a right side of the first display section;

when the moving plurality of the first objects is performed, moving is performed on a left object among the plurality of the first objects in accordance with direction inputted through the first direction input section, and moving is performed on a right object among the plurality of the first objects in accordance with a direction inputted through the second direction input section; and when the rotating of the first virtual camera is performed, rotating is performed on the first virtual camera such that the right object is displayed in the first game image on a right side with regard to a displayed position of the left object, wherein when the rotating of the first virtual camera is performed, adjusting is performed for a rotational velocity of the first virtual camera in accordance with a distance between the right object and the left object.

17. A game processing method executed by a computer, the method comprising:

individually moving, in virtual space, a plurality of first objects each associated to a direction input section among a plurality of direction input sections disposed on a first operating device, in accordance with directions inputted through the associated direction input sections;

controlling a first virtual camera in the virtual space in accordance with positions of the plurality of the first objects in the virtual space; and generating a first game image based on the first virtual camera, wherein when the controlling of the first virtual camera is performed, rotating of the first virtual camera is performed in accordance with the positions of the plurality of the first objects in the virtual space, such a that a certain one of the first objects in the first game image is displayed on a predetermined side with regard to a displayed position of another one of the first objects, wherein the certain one of the first objects and the another one of the first objects are each associated to a respective one of the plurality of direction input sections, wherein the first operating device includes a first display section;

the first game image is displayed on the first section;

the plurality of the direction input sections include a first direction input section disposed on a left side of the first display section and a second direction input section disposed on a right side of the first display section;

when the moving of the plurality of the first objects is performed, moving is performed on a left object among the plurality of the first objects in accordance with a direction inputted through the first direction input section, and moving is performed on a right object among the plurality of the first objects in accordance with a direction inputted through the second direction input section; and when the rotating of the first virtual camera is performed, rotating is performed on the first virtual camera such that the right object is displayed in the first game image on a right side with regard to a displayed position of the left object, the game processing method further comprising determining whether the right object and the left object are simultaneously in motion, wherein with regard to the rotating of the first virtual camera, the rotating of the first virtual camera is performed when the right object and the left object are simultaneously in motion, and the rotating of the first virtual camera is not performed when only either one of the right object and the left object is in motion.

18. A game apparatus comprising:

an object control section configured to individually move, in a virtual space, a plurality of first objects each associated to a direction input section among a plurality of direction input sections disposed on a first operating device, in accordance with directions inputted through the associated direction input sections;

a virtual camera control section configured to control a first virtual camera in the virtual space in accordance with positions of the plurality of the first objects in the virtual space; and a game image generation section configured to generate a first game image based on the first virtual camera, wherein the virtual camera control section includes a rotation control section configured to automatically rotate the first virtual camera in accordance with the positions of the plurality of the first objects in the virtual space, such that a certain one of the first objects in the first game image is displayed on a predetermined side with regard to a displayed position of another one of the first objects irrespective of whether the positions of the plurality of objects in the virtual space are such that the certain one of the first objects is on the predetermined side with regard to the another one of the first objects, wherein the certain one of the first objects and the another one of the first objects are each associated to a respective one of the plurality of direction input sections.

19. A handheld gaming device comprising:

a plurality of direction input sections;

an object control section configured to individually move, in a virtual space, a plurality of first objects each associated to a direction input section among the plurality of the direction input sections, in accordance with directions inputted through the associated direction input sections;

a virtual camera control section configured to control a first virtual camera in the virtual space in accordance with positions of the plurality of the first objects in the virtual space;

a game image generation section configured to generate a first game image based on the first virtual camera; and a first display section configured to display the first game image, wherein the virtual camera control section includes a rotation control section configured to automatically rotate the first virtual camera in accordance with the positions of the plurality of the first objects in the virtual space, such that a certain one of the first objects in the first game image is displayed on a predetermined side with regard to a displayed position of another one of the first objects irrespective of whether the positions of the plurality of objects in the virtual space are such that the certain one of the first objects is on the predetermined side with regard to the another one of the first objects, wherein the certain one of the first objects and the another one of the first objects are each associated to a respective one of the plurality of direction input sections.

20. A non-transitory computer-readable storage medium having stored thereon a game program executed by a computer, the computer being caused to function as:
   an object control section configured to individually move, in a virtual space, a plurality of first objects each associated to a direction input section among a plurality of direction input sections disposed on a first operating device, in accordance with directions inputted through the associated direction input sections;
   a virtual camera control section configured to control a first virtual camera in the virtual space in accordance with positions of the plurality of the first objects in the virtual space; and
   a game image generation section configured to generate a first game image based on the first virtual camera, wherein
   the virtual camera control includes a rotation control section configured to automatically rotate the first virtual camera in accordance with the positions of the plurality of the first objects in the virtual space, such that a certain one of the first objects in the first game image is displayed on a predetermined side with regard to a displayed position of another one of the first objects irrespective of whether the positions of the plurality of objects in the virtual space are such that the certain one of the first objects is on the predetermined side with regard to the another one of the first objects, wherein the certain one of the first objects and the another one of the first objects are each associated to a respective one of the plurality of direction input sections.

* * * * *